US012495956B2

(12) United States Patent
Hathorn et al.

(10) Patent No.: US 12,495,956 B2
(45) Date of Patent: Dec. 16, 2025

(54) EXTENDABLE ENDOSCOPY BAND WITH VISUAL INDICATOR

(71) Applicant: ColoWrap, LLC., Durham, NC (US)

(72) Inventors: James Hathorn, Durham, NC (US); Dustin Bass, Durham, NC (US); Michael Sieber, Richmond, VA (US)

(73) Assignee: ColoWrap, LLC.

( * ) Notice: Subject to any disclaimer, the term of this patent is extended or adjusted under 35 U.S.C. 154(b) by 451 days.

(21) Appl. No.: 18/146,341

(22) Filed: Dec. 23, 2022

(65) Prior Publication Data
US 2023/0200628 A1    Jun. 29, 2023

Related U.S. Application Data

(60) Provisional application No. 63/325,546, filed on Mar. 30, 2022, provisional application No. 63/293,731, filed on Dec. 24, 2021.

(51) Int. Cl.
*A61B 1/31*    (2006.01)
*A61B 1/00*    (2006.01)

(52) U.S. Cl.
CPC ............ *A61B 1/00148* (2022.02); *A61B 1/31* (2013.01)

(58) Field of Classification Search
CPC ......... A61B 1/00; A61B 1/31; A61B 1/00148; A61B 17/1325; A61B 2017/00818; A61F 5/0009
See application file for complete search history.

(56) References Cited

U.S. PATENT DOCUMENTS

| 6,156,001 A | * | 12/2000 | Frangi | A61F 5/028 |
| | | | | 602/65 |
| 2013/0178893 A1 | * | 7/2013 | Hathorn | A41C 1/02 |
| | | | | 606/201 |
| 2015/0105699 A1 | * | 4/2015 | Hathorn | A61B 5/742 |
| | | | | 600/587 |

(Continued)

FOREIGN PATENT DOCUMENTS

| EP | 3082662 B1 | 3/2019 |
| KR | 20130128189 A | 11/2013 |

OTHER PUBLICATIONS

International Preliminary Report on Patentability corresponding to PCT Application No. PCT/US2022/054007 dated Jun. 20, 2024 (12 pages).

(Continued)

*Primary Examiner* — Vi X Nguyen
(74) *Attorney, Agent, or Firm* — Procopio, Cory, Hargreaves & Savitch LLP

(57) ABSTRACT

An endoscopy support system, including an extendable primary wrap comprising a band of elastic material sized for placement around a lower abdomen of a subject and at least one elastic, secondary strap having a first end fixed to the primary wrap and a second end comprising a coupling mechanism for removably coupling the second end to the primary wrap, wherein the at least one elastic strap is configured to extend in a left to right direction across a front abdomen portion of the primary wrap in order to exert an additional targeted force to a portion of the abdomen of the subject. The system further includes at least one extension piece having an attachment mechanism to removably couple to the primary wrap or the at least one secondary strap.

15 Claims, 26 Drawing Sheets

(56) References Cited

U.S. PATENT DOCUMENTS

2020/0138619 A1 5/2020 Cisko et al.
2021/0177685 A1 6/2021 Hathorn

OTHER PUBLICATIONS

International Search Report and Written Opinion corresponding to International Application No. PCT/US2022/054007, dated Jun. 2, 2023 (20 pages).
Invitation to Pay Additional Fees and Communication Relating to the Results of the Partial Internal Search (Form PCT/ISA/206) corresponding to International Application No. PCT/US2022/54007, dated Apr. 11, 2023 (10 pages).

* cited by examiner

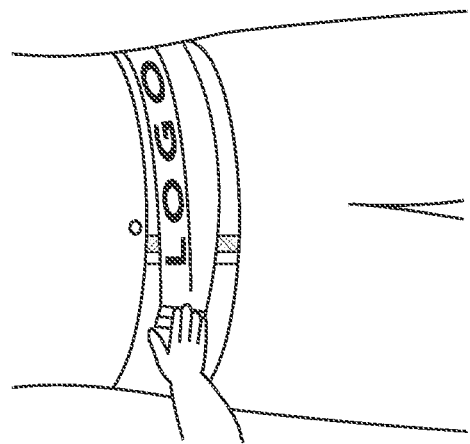
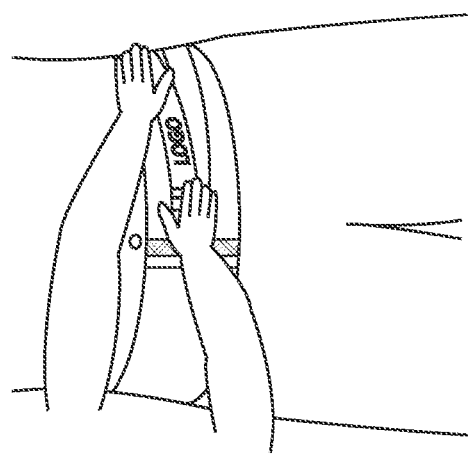
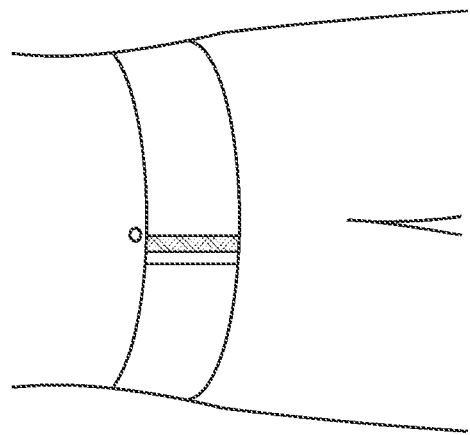
FIG. 4

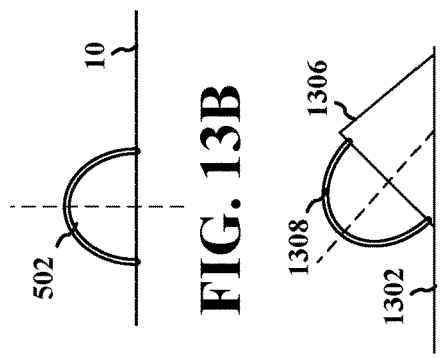
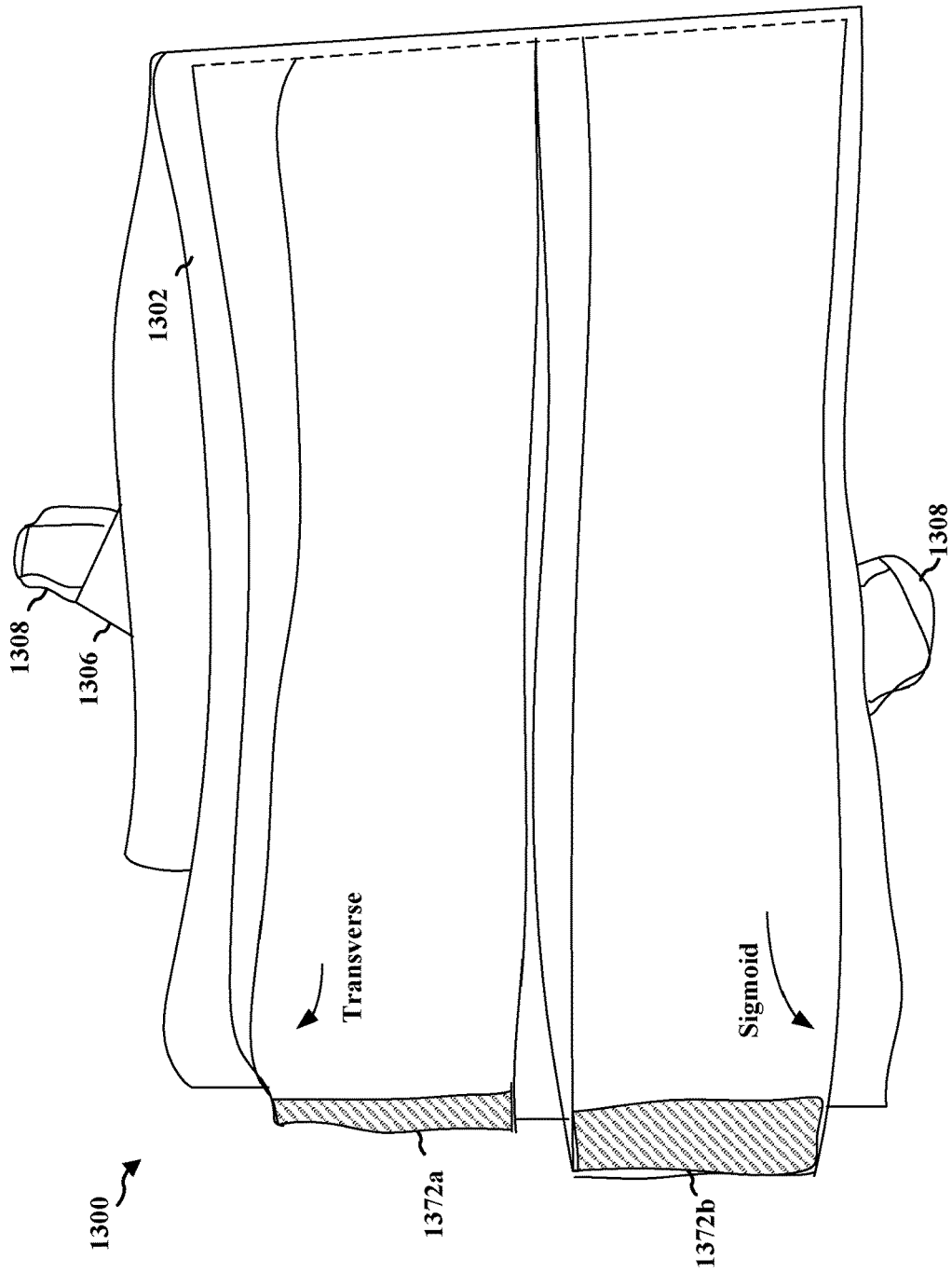
FIG. 13B
FIG. 13C
FIG. 13A

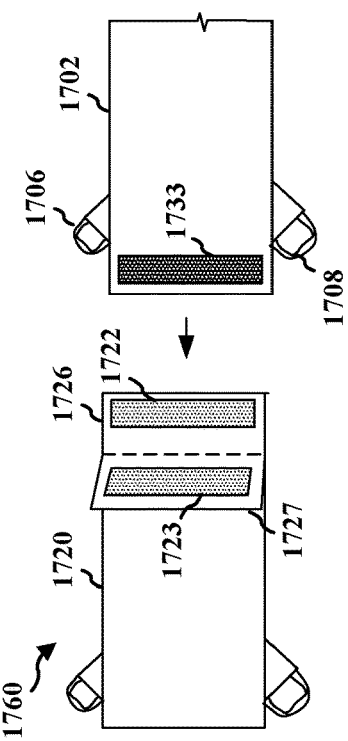
FIG. 17C
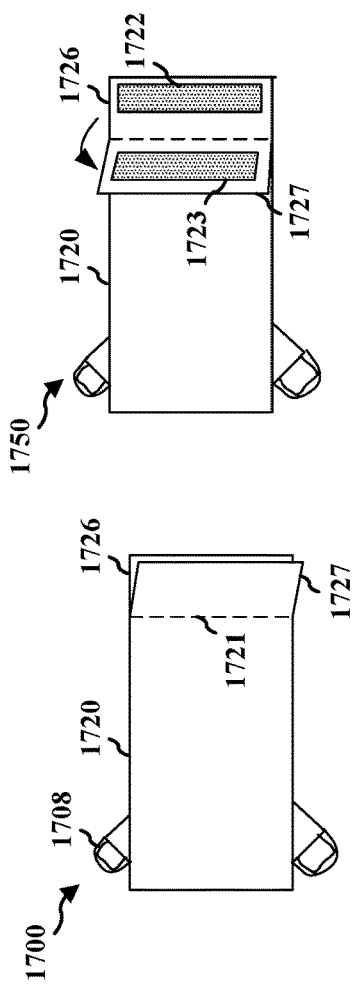
FIG. 17B
FIG. 17A
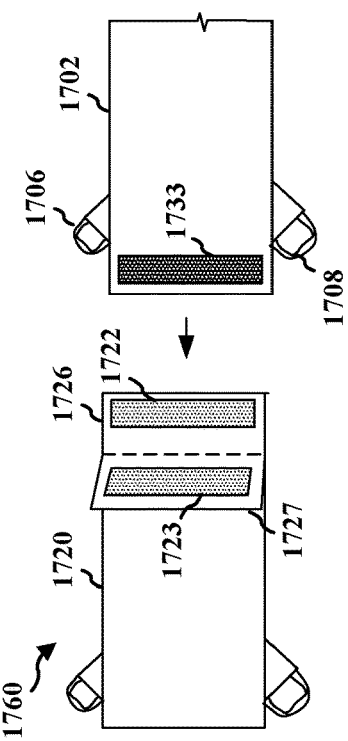
FIG. 17E
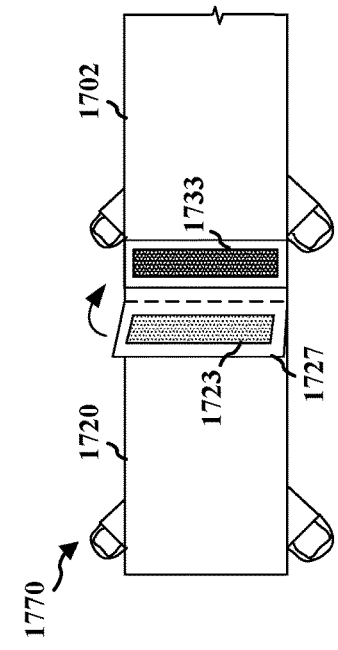
FIG. 17D

EXTENDABLE ENDOSCOPY BAND WITH VISUAL INDICATOR

CROSS REFERENCE TO RELATED APPLICATION(S)

This application claims the benefit of and priority to U.S. Provisional Application Ser. No. 63/293,731, entitled "Endoscopy Band Extension with Visual Indicator" and filed on Dec. 24, 2021, and U.S. Provisional Application Ser. No. 63/325,546, entitled "Endoscopy Band Extension with Visual Indicator" and filed on Mar. 30, 2022, the entire contents of both of which are expressly incorporated by reference herein in its entirety.

INTRODUCTION

A colonoscopy is an example of an endoscopy procedure including an examination of the large intestine or colon through the use of a colonoscope. A colonoscope is a flexible, tube-like inspection device having a camera at its end. Colonoscopies are performed for a variety of medical reasons including detection of inflamed tissue, ulcers, abnormal growths or polyps, and colorectal cancer. Colonoscopy is increasingly used as a screening tool to detect colorectal cancer.

During a colonoscopy, as an example of an endoscopy procedure, a colonoscope is inserted into a patient's rectum and then advanced to the beginning of the colon (an area known as the cecum) in order to examine the lining of the large intestine. The efficiency and accuracy of this procedure is largely dependent on the ease with which the colonoscope can be advanced. During the procedure, the colon may become over-distended or flopped in unnatural directions creating loops that hinder the advancement of the colonoscope and resulting in patient discomfort, longer examination times, and potentially inaccurate or incomplete screenings.

Currently, the difficulty in advancing the scope is addressed by the application of manual pressure by a technician to manually support the patient's colon. The application of manual pressure is time-consuming and varies depending on the particular technician's strength, technique, endurance, and training. In order to apply differential pressure, the technician may roll the patient from the left side to a supine or to a prone position, which can be a difficult task with a sedated patient. The application of manual pressure and movement of the patient in order to support the patient's colon and advance the colonoscope during the procedure places a physical toll on the technician.

SUMMARY

In an aspect of the disclosure, a method and apparatus for applying pressure to the abdomen of a patient is provided to ease the passage of an endoscope during procedures used to examine the bowels including colonoscopy, sigmoidoscopy, and enteroscopy. Aspects presented herein exert both broad, uniform lower abdominal pressure as well as additional, location-specific pressure upon various parts of the colon and/or small bowel to assist with the advancement, withdrawal, and/or visualization as part of an endoscopy, colonoscopy, sigmoidoscopy, or enteroscopy procedure. Aspects presented herein may assist in preventing and reducing intestinal looping, eliminating the need for the application of manual pressure, improving patient safety, comfort, and satisfaction, and preventing musculoskeletal injury to endoscopy healthcare providers. Aspects presented herein provide mechanisms and components that enable improved placement, sizing, and application for the device.

Aspects include an endoscopy support system, comprising: an extendable primary wrap comprising a band of elastic material sized for placement around a lower abdomen of a subject; at least one elastic secondary strap having a first end fixed to the extendable primary wrap and a second end comprising a coupling mechanism for removably coupling the second end to the extendable primary wrap, wherein the at least one elastic secondary strap is configured to extend in a left to right direction across a front abdomen portion of the extendable primary wrap in order to exert an additional targeted force to a targeted area of an abdomen of the subject; and at least one extension piece having an attachment mechanism to removably couple to the extendable primary wrap or the at least one elastic secondary strap.

Aspects include extension kit for an endoscopy support apparatus, comprising: at least one extension piece, each extension piece including: an elastic material; and a fastener configured to removably couple a corresponding extension piece to a component of an endoscopy support band.

Additional advantages and novel features of aspects of the present invention will be set forth in part in the description that follows, and in part will become more apparent to those skilled in the art upon examination of the following or upon learning by practice thereof.

BRIEF DESCRIPTION OF THE DRAWINGS

FIG. 4 illustrates a method of use of an endoscopy band device with an elastic secondary strap capable of retaining tension and exerting directed force for an endoscopy procedure.

FIGS. 13A, 13B, and 13C illustrate aspects of an endoscopy band having offset handles or loops.

FIGS. 17A, 17B, 17C, 17D, and 17E illustrate aspects of an extension component for a primary wrap and a manner of applying the extension piece to the primary band.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Aspects presented herein comprise a primary abdominal wrap that is secured around the lower abdomen of the patient and a secondary strap that provides directed force and support to the various areas of the colon or small bowel. In some aspects, the various areas may include the sigmoid colon. When the device is securely fastened, the secondary strap may be adjusted to serve as a focused support or 'splint' various areas of the colon or small bowel. The apparatus may further include visual guides or indicators that provide visual reference marks and guidance for placing the apparatus on a patient and/or for adjusting directed force using the secondary strap. Aspects further include a primary wrap and/or secondary straps that are configured to receive one or more extension pieces. Aspects further include one or more extension pieces that are configured to be received and removably fastened to a primary abdominal wrap and/or one or more secondary straps for an endoscopy compression device. Aspects of the endoscopy compression device may assist a user in the placement and/or adjustment of the compression provided by the wrap. The extension pieces may enable different sizing for the compression device to provide a device that may be applied to patients of various size. The extension pieces may enable added areas of targeted compression by at least one secondary strap allowing an extended area for targeted compression.

Figure 1A:
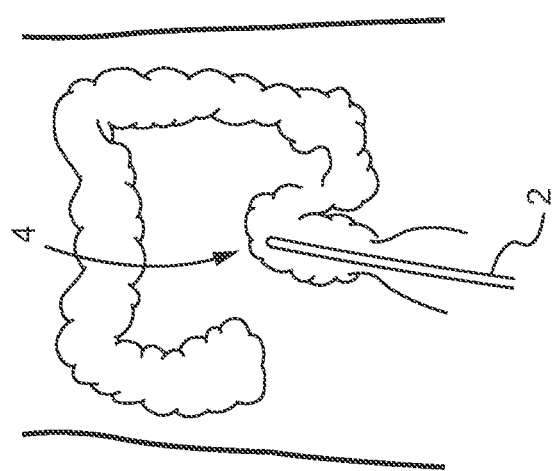
FIG. 1A is a schematic view of a colon with an endoscope (also known as a colonoscope for colonoscopy procedures) partially inserted therein.
Figure 1B:
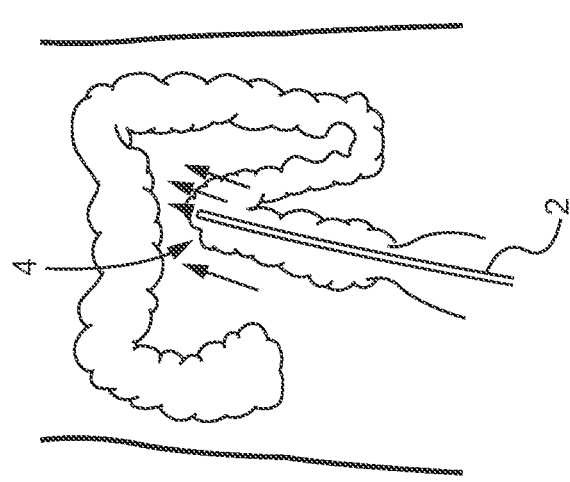
FIG. 1B is a schematic view of a colon in which a sigmoid loop has developed due to an attempt to advance the endoscope against an unsupported colon wall.
Figure 1C:
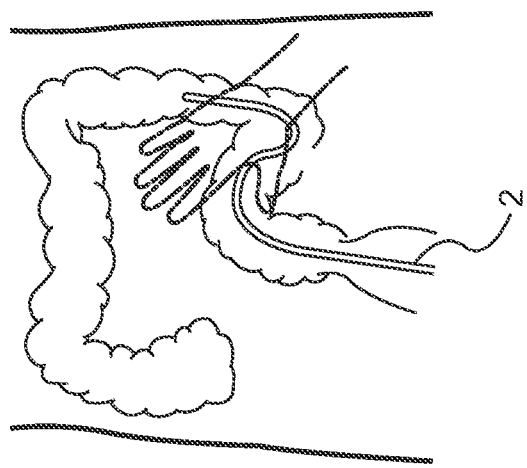
FIG. 1C is a schematic view of a colon showing the application of manual pressure to the colon to facilitate insertion of an endoscope.

FIGS. 1A-1C, illustrate a sequence of steps of a colonoscopy. In FIG. 1A, a colonoscope 2 is inserted into the patient's rectum and advanced forward through the length of the colon. As the operator passes the colonoscope through the colon, for example a sigmoid region of the colon 4, the colonoscope may become impinged and cause distention and looping of the anatomy, as shown in FIG. 1B. The distention causes discomfort to the patient and increases the time required for the colonoscopy. In order to reduce the distended or looped area, a technician may apply manual pressure to abdomen of the patient. Among other examples, the technician may be a nurse, assistant, or other staff member. For example, the pressure may be applied by a nurse or surgical assistant as shown in FIG. 1C.

The application of manual pressure is time-consuming and places a physical toll on the technician. The effectiveness of the manual pressure varies depending on the particular technician's strength, technique, endurance, and training. In order to apply differential pressure, the technician may roll the patient from the left side to a supine or to a prone position, which can be a difficult task with a sedated patient. The application of manual pressure and movement of the patient in order to support the patient's colon and advance the colonoscope during the procedure places may even lead to injury of the technician.

Many patients undergo colonoscopy while placed in the left lateral decubitus position on the stretcher or operating table. Additional information about the use of such manual pressure can be found in Prechel J A, Hucke R. Safe and effective abdominal pressure during colonoscopy: forearm versus open hand technique. Gastroenterol Nurs 2009; 32:27-30; quiz 31-2, the entire contents of which are incorporated herein by reference. In applying manual pressure, the technician may reach over the patient from the opposite side of the table and to deploy pressure by placing their hands against the patient's sigmoid colon and then leaning backwards, using their bodyweight for leverage to exert force. While these methods may be generally effective at generating pressure, they have also been identified as a causative factor for the high rate of work-related injuries among endoscopy nurses and staff. Physicians performing colonoscopy suffer work-related musculoskeletal injury at a particularly high-rate as well. The most frequent site of physician injury is the right upper extremity which experiences peak torque forces when while operators are attempting to advance the scope through (a looping) sigmoid colon. Additional details can be found in Spanarkel M, Hathorn J P. Looping During Colonoscopy: A Major, Implied Cause of Injury Among Endoscopy Healthcare Providers and a Proposed Solution, 2013, the entire contents of which are incorporated herein by reference.

Aspects described herein may similarly be applied for other endoscopic procedures such as sigmoidoscopy and retrograde enteroscopy procedures, among other examples. Sigmoidoscopy is an examination of only the lower part of the colon, from the anus to the descending colon. An endoscope is inserted into the lower part of the colon. Enteroscopy is an examination of the small bowel. During retrograde enteroscopy, an endoscope is inserted in the anus and passed through the colon and the cecum and into the small bowel. Successfully navigating the loop-prone sigmoid region is necessary to complete both sigmoidoscopy and retrograde enteroscopy and thus aspects described herein can be used to help facilitate colonoscopy, sigmoidoscopy, retrograde enteroscopy, and other endoscopic procedures.

The teachings of each of U.S. application Ser. No. 17/180,676, entitled Endoscopy Band with Visual Indicator to Assist Placement, and filed on Feb. 19, 2021; U.S. application Ser. No. 16/818,877, entitled Endoscopy Band with Sigmoid Support Apparatus, and filed on Mar. 13, 2020; U.S. application Ser. No. 15/256,019, entitled "METHOD AND APPARATUS FOR ENHANCED VISUALIZATION DURING ENDOSCOPY," and filed on Sep. 2, 2016; U.S. Provisional Application No. 62/214,747, entitled "IMPROVED BOWEL STABILITY AND ENHANCED VISUALIZATION DURING ENDOSCOPY" and filed on Sep. 4, 2015; and U.S. application Ser. No. 14/575,860, entitled "ENDOSCOPY BAND WITH SIGMOID SUPPORT APPARATUS," and filed on Dec. 18, 2014; U.S. application Ser. No. 13/344,715, entitled "METHOD AND APPARATUS FOR TENSILE COLONOSCOPY COMPRESSION," and filed on Jan. 6, 2012; U.S. Provisional Application Ser. No. 61/917,469, entitled "COLONOSCOPY BAND WITH SIGMOID SPLINT" and filed on Dec. 18, 2013; U.S. Provisional Application Ser. No. 61/944,658 entitled "ENDOSCOPY BAND WITH SIGMOID SUPPORT APPARATUS" and filed on Feb. 26, 2014; U.S. Provisional Application Ser. No. 62/978,797, entitled "Endoscopy Band With Visual Indicator to Assist Placement" and filed on Feb. 19, 2020, are expressly incorporated by reference herein in their entirety.

Figure 2:
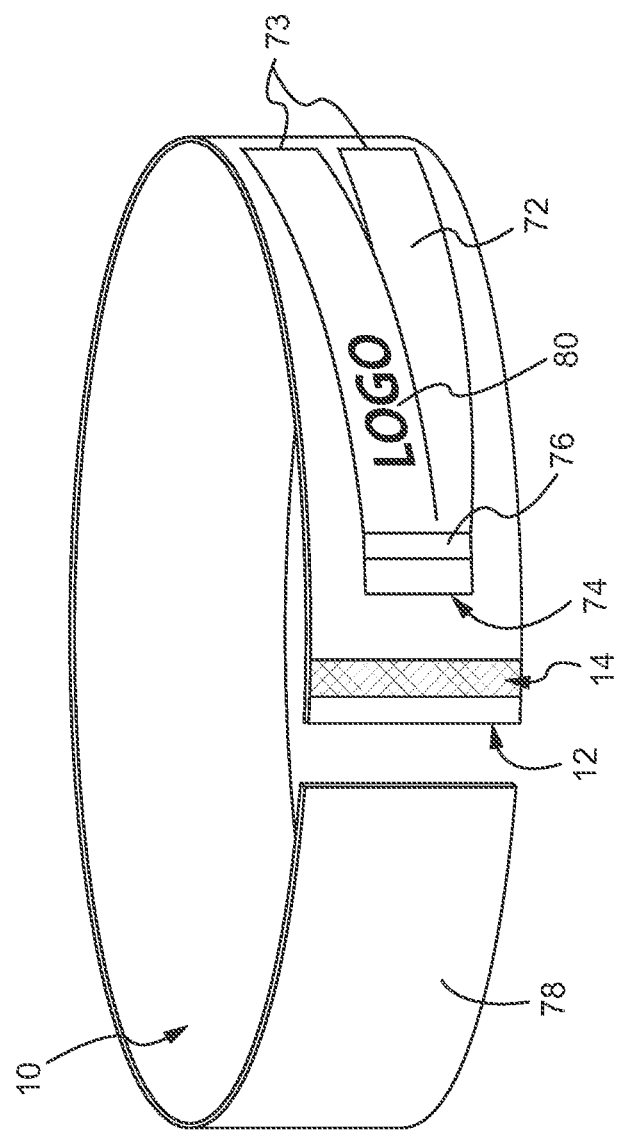
FIG. 2 is an illustration of an unfastened endoscopy band device with an elastic secondary strap capable of retaining tension and exerting directed force to the colon, including the sigmoid, traverse, and cecal regions, stretched and fastened to the primary wrap.
Figure 5:
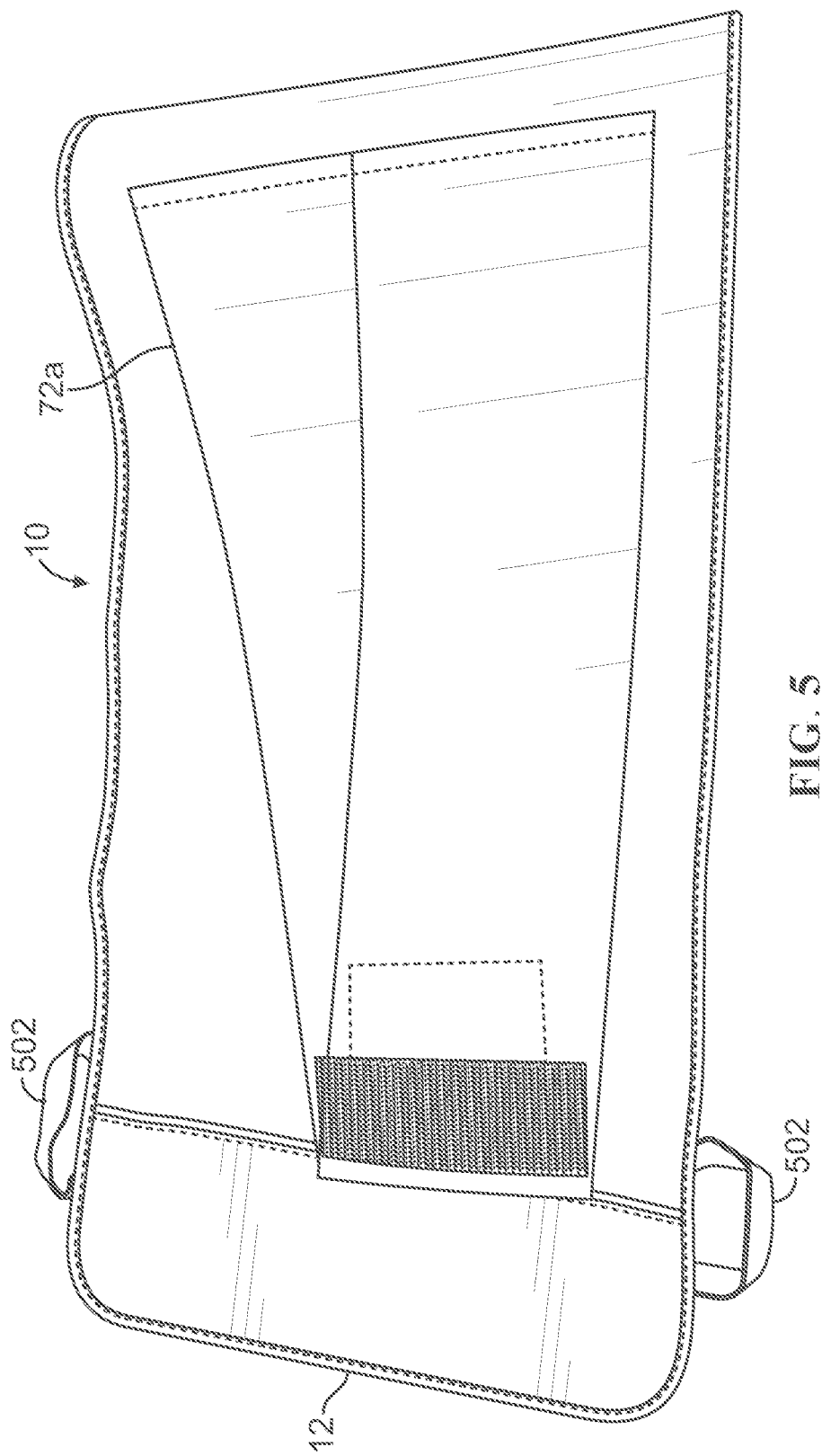
FIG. 5 is an illustration of a portion of an endoscopy band showing a tapered secondary strap.
Figure 23:
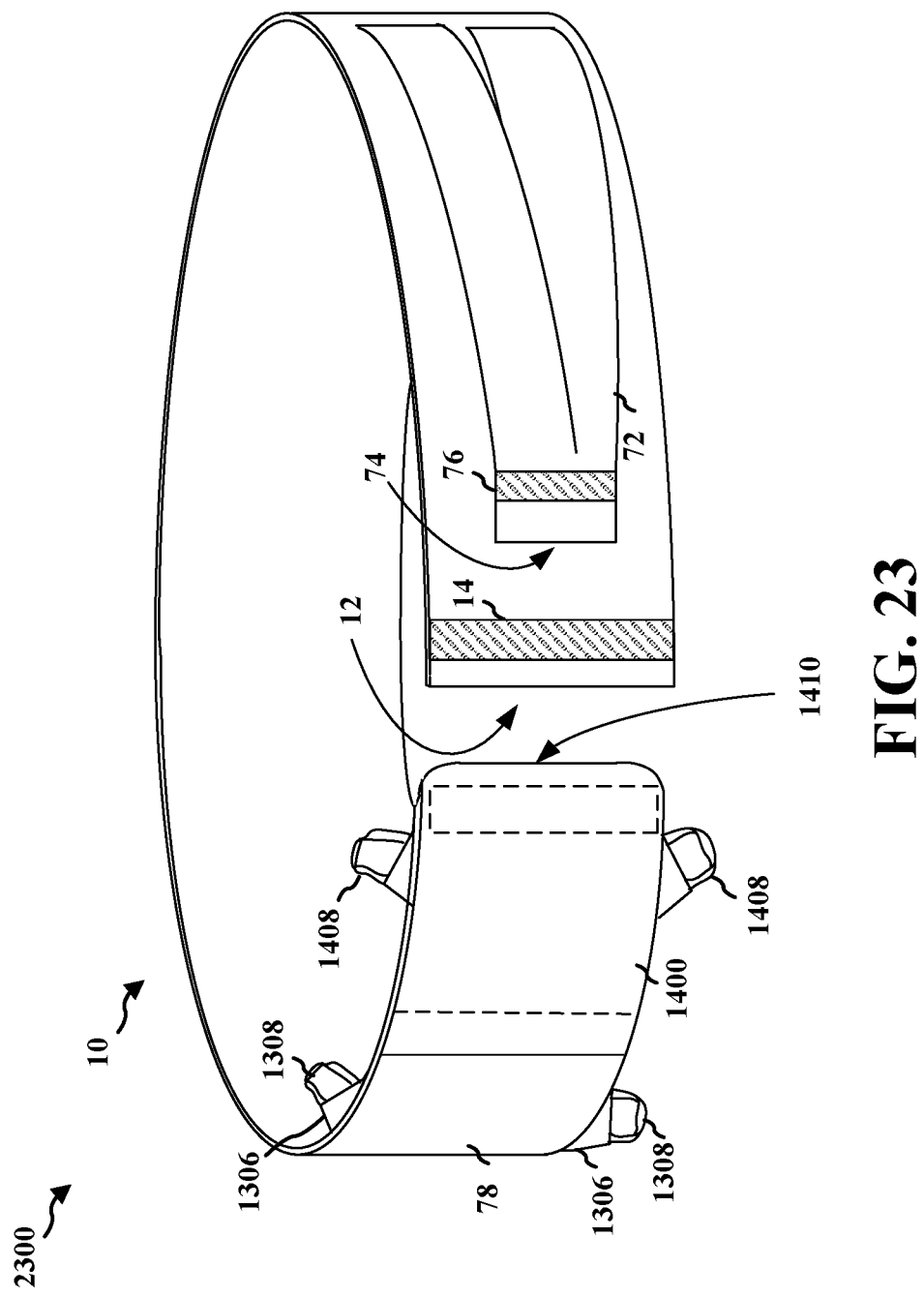
FIG. 23 illustrates an endoscopy band having an extension piece applied to extend a primary wrap of the endoscopy band.

FIG. 2 illustrates an example device including a primary elongated band or wrap 10 of sufficient length for placement around a patient's lower abdomen. A closing mechanism 12 may be provided at the end of the primary band to secure the device around the patient so that it provides the desired amount of broad support and compression. A handle 14 may be sewn onto the exterior of one or both ends of the primary wrap to assist in fastening and closure. FIG. 5 illustrates a portion of an example wrap 10 having handles 502 provided at an end of the wrap 10. The handles may be used by the technician to stretch the wrap and apply a desired degree of compression when fastening the primary wrap 10 around the patient. In some aspects, an extension component, or offset piece, may extend from the primary wrap 10, and the handles 502 may be formed as a loop of material that is placed at the respective extensions. FIG. 13A illustrates an example of an abdominal compression device includes a primary wrap 1302 having extensions 1306 (which may also be referred to as offsets) extending from an edge of the primary wrap near the edge of the primary wrap that removably fastens to the exterior of the primary wrap, (e.g., at the edge opposite the edge 12) and having loops 1308 or handles provided at the respective extensions 1306. FIG. 13A illustrates the endoscopy band folded on itself. FIG. 23 illustrates an example of an endoscopy band showing the edge at which 1308 and extensions 1306 are provided. The loops 1308 may be referred to as finger loops and may be sized for a user to insert a finger through the loop in order to provide added leverage for the user to pull the edge of the primary wrap around the user in order to apply compression when fastening the ends of the primary wrap. The extensions help to offset the loops 1308 providing better leverage for a user when tightening the primary wrap. The material of the extensions 1306 may comprise a soft, biocompatible material that is non-abrasive, because the extensions may be in direct contact with a patient's skin. The extensions 1306 may make the loops easier for the user to find while applying the compression device to a patient by extending the loops from the edge of the primary wrap so that the loops are less likely to become tucked under an edge of the primary wrap and not be noticed by a user. Additionally, as illustrated in FIG. 13A, the extensions may provide an angled attachment for the loops 1308 so that the loops or handles are provided at an angle relative to an edge along the length of the primary wrap rather than extending directly from the edge of the primary wrap. FIG. 13B illustrates a placement of the loop 502 (e.g., which corresponds to 1308) directly to the edge of the primary wrap 10 (which corresponds to 1302), such that an upper portion of the loop is in a direction generally perpendicular to the edge of the primary wrap. The extension 1306 extends from the edge of the primary wrap and provides an angled surface on which the loop 1308 is provided. The upper portion of the loop in FIG. 13C is positioned at a smaller angle relative to the edge of the primary wrap than the placement in FIG. 13B. The extension 1306 angles the loops in the direction in which they are pulled to adjust the compression of the primary wrap and provides better leverage to the user. In some aspects, the angled placement of the handles or finger loops may improve the leverage of the user in pulling the edge of the primary wrap underneath the opposite edge in order to apply compression before fastening the opposite edge to the primary wrap, e.g., using a hook and loop or hook and pile type fastener, in order to maintain the compression on the abdominal region of the patient. In some aspects, the extensions 1306 may further assist the user in locating the handles or loops 1308 while the compression device is applied to the patient in order to adjust compression, e.g., during an endoscopy procedure. Extending the loops 1308 or handles away from an edge of the primary wrap, may make it easier for the user to access the loops while the compression device is compressing the patient's abdomen. FIG. 13A illustrates the abdominal compression device having multiple secondary straps 1372a and 1372b extended from a portion of the primary wrap 1302. The offset of the loops or handles through the use of the extensions 1306 may similarly be applied in an abdominal compression device having a single secondary strap.

The primary wrap 10 may have a circumferential length between approximately 15 and 75 inches in order to accommodate varying abdominal girths in patients. The width of the primary wrap 10 may be between 6 and 10 inches, although variations having widths of between 3 and 20 inches may be used depending on the size of the patient and to accommodate special circumstances such as an abdominal hernia or a large pannus. For example, the primary wrap may be configured to have a width that allows it to be fastened around the patient's lower abdomen with the upper edge of the wrap just below the umbilicus, or near the umbilicus, and the bottom edge of the wrap along or close to the pubic line. The width of the primary wrap may be selected so as not to be so large that the upper edge conceals the umbilicus and additional areas of the abdomen above the umbilicus. This configuration may be made in order to avoid pressure on the diaphragm or stomach, as pressure on the diaphragm and stomach during colonoscopy can increase the risk of oxygen deprivation and aspiration events, respectively, due to the fact that the patient is generally sedated during the procedure. The primary wrap 10 may comprise, entirely or in part, a flexible, bio-compatible foam, rubber, neoprene, polyester, nylon, non-woven or woven fabric, mesh fabric, synthetic fabric, microfiber fabric, silicon or vinyl plastic, or any other materials generally known to be used in medical fabrics and goods. The primary wrap 10 may be composed of both elastic and inelastic materials. In one example, the primary wrap 10 may comprise multiple layers laminated together. For example, the primary wrap 10 may comprise a neoprene layer and an outer fabric layer laminated on the neoprene layer. The fabric layer may enable the secondary strap to be removably fastened along the length of the primary wrap and may also enable visual indicators to be printed on the fabric, such as a nylon loop fabric. The primary wrap may also comprise an inner layer laminated on the neoprene. The inner layer may comprise a fabric or other material that is selected for skin sensitivity. For example, the inner layer may comprise a fabric or other material that is latex free, biocompatible, and/or skin sensitive. The inner layer may be the layer that is applied against the skin of the patient. In some aspects, the primary wrap may comprise 3D spacer fabrics, which may provide compression, elasticity, cushioning, breathability, air permeability, thermal insulation, temperature regulation, flexibility with resistance to bending/rolling, good draping, adjustable vapor transport, good aging qualities, surface and wash resistance, sterilization capabilities, and diverse surface design capabilities. A 3D spacer fabric may comprise a manufactured textile structure in which two fabric layers are connected by a layer of pile threads, which may be referred to as pile yarns.

The primary wrap may comprise two or more sections that vary in material type. In one example, a first set of one or more sections may be composed of a flexible, elastic or semi-elastic, medium-thickness, latex-free neoprene with thin polyester or nylon glued to its interior and exterior sides. Among others, this material may be capable of providing broad, firm, yet comfortable support to the patient's abdominal region. Another set of one or more sections of the primary wrap 10 may comprise a relatively inelastic material, such as a woven fabric. The inelastic section may be provided at the location into which or under which an insert is placed. Upon deployment of the device, the inelastic section may be positioned in the patient's lower left abdominal quadrant, over the sigmoid region.

For the primary wrap to provide appropriate general compression and support, it may be important that the wrap remain flat against the body when fastened around the abdomen. This is notable because certain materials and designs have a tendency to roll-up when stretched or wrapped around the abdomen, particularly when the device is being applied to patients with a large pannus. To prevent roll-up from occurring, aspects of the invention may include reinforcements to ensure that the primary abdominal wrap remains flat against the body when used in patients of varying body sizes. This may be accomplished by the application of serge stitching along the edges of the primary abdominal band.

The primary wrap may also accommodate an insert or attachment that provides specific support to one or more areas of the colon including the sigmoid, transverse, and cecal regions as well as the splenic and hepatic flexures. When the device is securely fastened, the secondary strap, the insert, or both, may be pushed, pulled, or otherwise pressed into the body in a manner that serves to support or 'splint' one or more areas of the colon including the sigmoid, transverse, and cecal regions as well as the splenic and hepatic flexures. Aspects described herein may be designed to provide broad lower abdominal support, and additional direct force to one or more areas of the colon including the sigmoid, transverse, and cecal regions as well as the splenic and hepatic flexures of a patient undergoing colonoscopy.

The primary wrap 10 may be placed around the patient's lower abdomen and secured using a closing mechanism 12 consisting of a strip of VELCRO® or hook material 13 placed on the interior of the wrap 10 close to the location of the handle 14 on the opposite side. This hook strip 13 may be fastened to the exterior side of the opposite end of the primary wrap 10.

The edges of the hook strip 13 might not extend to the edges of the primary wrap 10. This construction may be designed to minimize the chance that the hook strip 13 comes into contact with the patient's skin, or with the gloves of the nurse or assistant deploying the device, as there is a small but known risk of VELCRO®, or a hook and pile material, being capable of tearing medical gloves. A hook and pile material may also be referred to as a hook and loop material.

An additional feature designed to reduce the likelihood of patient and provider contact with the hook material. In aspects incorporating this feature, prior to the device being packaged, a thin layer of material may be applied to hook strips that are incorporated into the device. This layer may comprise, e.g., paper, plastic, fabric, silicon, or any other biocompatible material typically used in healthcare products. Additionally, the layer may be lightly adhered to the hook strips so that it remains in place—until it is easily removed and disposed of by the end user just prior to the device's application on the patient. This feature may be helpful in use of a secondary strap 72, because it may be helpful for the secondary strap 72 to remain unfastened until the primary wrap 10 is fastened and properly positioned. Having a layer covering the hook strip 75 on the secondary strap 72 helps to ensure that the secondary strap will not be accidentally fastened while the user is securing the primary wrap 10 around the patient's abdomen.

Figure 3:
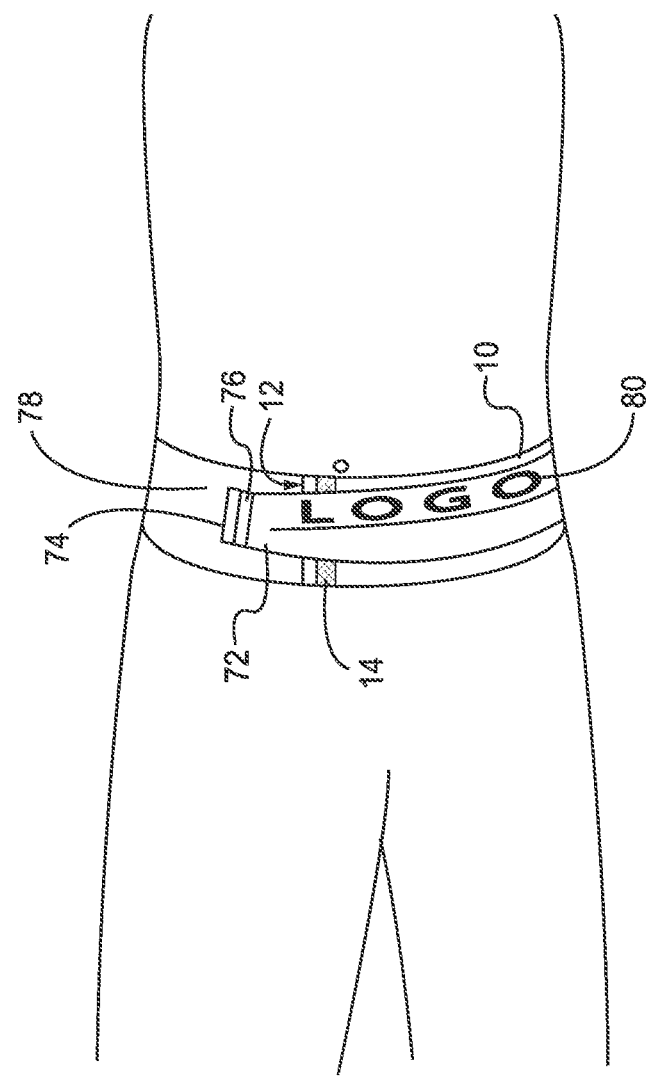
FIG. 3 is a perspective view of the endoscopy band device depicted in FIG. 2 as it appears when applied to a patient, in accordance with aspects of the present invention.
Figure 8:
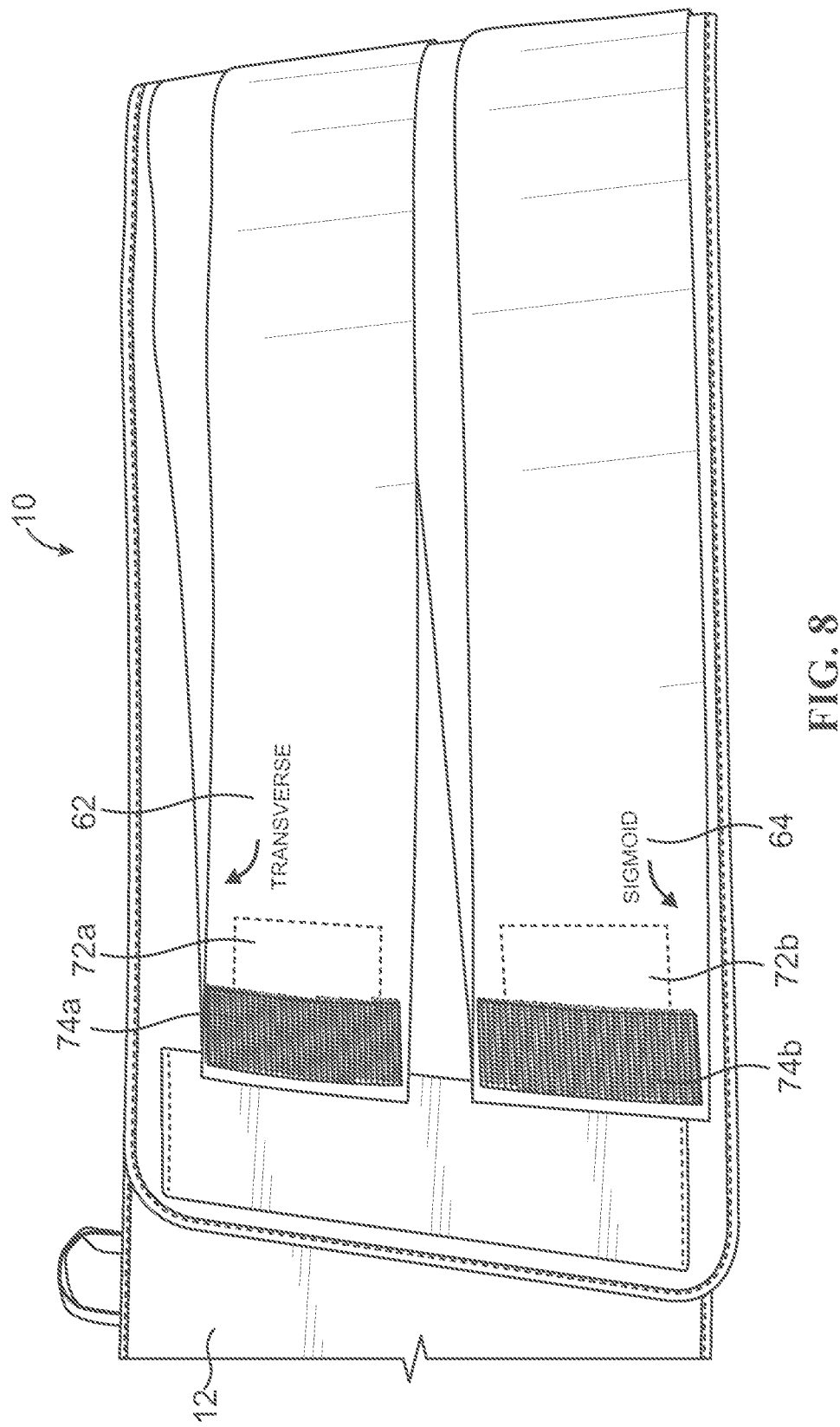
FIG. 8 illustrates an endoscopy band having multiple secondary straps with visual guides for adjusting directional force with the secondary straps.

The addition of one or more appendages on the exterior of the primary wrap facilitates the application of additional directed force, e.g., without requiring adjustment of the primary wrap. The appendages may comprise one, or multiple, straps attached on one side to the edge or edges of non-elastic section. FIGS. 2-4 illustrate an example with a single secondary strap. FIG. 8 illustrates an example having multiple secondary straps 72a, 72b. On the unattached end of these straps, there may be a closing mechanism, e.g., 74a, 74b. The closing mechanism may include a handle or loop near the end of the strap, that may provide greater ease to a technician, or added security, in pulling the elastic strap to apply targeted, additional compression. The straps 72a, 72b may be pulled horizontally along the exterior of the primary wrap, and fastened using the closing mechanism securely enough to maintain tension. The one or more straps may comprise an elastic material that is configured to be stretched and fastened to the primary wrap in order to apply targeted compression through elastic contraction of the material. The amount of targeted compression may be adjusted through adjustment of the position at which the removable end is coupled to the primary wrap, such as through a hook and loop type fastener. VELCRO® is an example of a hook and loop type fastener. In some examples, the straps may be secured to an inelastic section of the primary wrap, and the tension generated by fastening these straps may cause additional compression of the inelastic section and/or an insert toward the body of the patient.

As depicted in FIG. 4, the secondary strap 72 may allow nurses and technicians to easily adjust and readjust the force on a particular region of the patient's abdomen, such as the sigmoid colon and/or the transverse colon among other example regions, from the location in the procedure or operating room that these staff members typically occupy, relative to how patients are often positioned during an endoscopy procedure. The endoscopy compression device described herein additionally eliminates the need for the nurse or assistant to provide manual abdominal compression, thereby reducing their risk of musculoskeletal injury. Additional, manual compression may be applied along with compression from the device. The device is designed to be quickly and easily removed should the need arise.

The secondary strap 72 may be coupled, e.g., sewn or permanently fastened, to a portion of the wrap that is configured for placement over a left side of the patient's lower abdomen. The portion of the secondary strap 72 that is coupled to the primary wrap may be referred to as the secured end and may be non-removably coupled to the strap, such as sewn or formed as an extension of the primary wrap material. The strap can be configured to be pulled from left to right, e.g., to stretch across the lower abdomen and/or left lower abdominal quadrant from the left side of the patient's body towards right side of the patient's body. This placement of the secondary strap 72 may enable the compression to be easily adjusted as the patient lies on their left side during the procedure. As the strap pulls from left to right across the lower abdomen, additional leverage and compression may be generated by the patient's body when the strap is in place. As the strap stretches from left to right cross the patient's abdomen, the level of compression generated by the device can easily be adjusted during the procedure, e.g., while the patient is lying on their left side.

In some aspects, the secured end of the strap 72 may be connected to the wrap 10 in a manner that the secured end of the strap is under the patient during a procedure.

As illustrated in FIGS. 2-4, the device may include a primary wrap 10, with a closing mechanism 12, and at least one handle 14 to assist in fastening the primary wrap around the patient's lower abdomen. The device may also include a secondary strap 72 attached to the exterior side 78 of the primary wrap 10, with a closing mechanism 74 that allows the strap, e.g., to be fastened to the exterior side 78 of the primary wrap 10. In an aspect, the closing mechanism 74 of the secondary strap 72 may comprise a hook strip 75 on the inside of the secondary strap 72 that is capable of fastening anywhere along the exterior side 78 of the primary wrap 10. In this example, the exterior side 78 of the primary wrap 10 may comprise a hook-compatible material to which the hook strip 75 can be fastened and remain fastened while the secondary strap is stretched and under tension. The secondary strap 72 may be constructed of an elastic or semi-elastic material that is capable of retaining tension when stretched horizontally and fastened to the exterior side 78 of the primary wrap 10 using the closing mechanism 74. The secondary strap 72 may comprise the same or different materials than the materials comprised in the primary wrap 10. The secondary strap 72 may comprise one or more layers of materials. In an example, the secondary strap 72 may comprise an elastic strap the entire length of which equals approximately twice the intended length of the secondary strap 72. As illustrated, the secondary strap may taper along a length of the strap 72. In the example in FIGS. 2-4, the elastic strap may be doubled-over, and both ends may be sewn to the exterior 78 of the primary wrap 10 along the same vertical line 73, creating the horizontal 'V' appearance of the secondary strap 72. Doubling-over the material composing the secondary strap can serve to increase the breadth and force generated by the secondary strap, while preventing the incurrence of additional materials costs that would be associated with using a taller, single-layered strap instead. The midpoint of the secondary strap may be positioned approximately over the patient's lower left quadrant once it is stretched and fastened. In other examples, such as shown in FIGS. 5, 6, and 8, the secondary strap 72 may be a unitary piece having at least one tapering edge.

Figure 6:
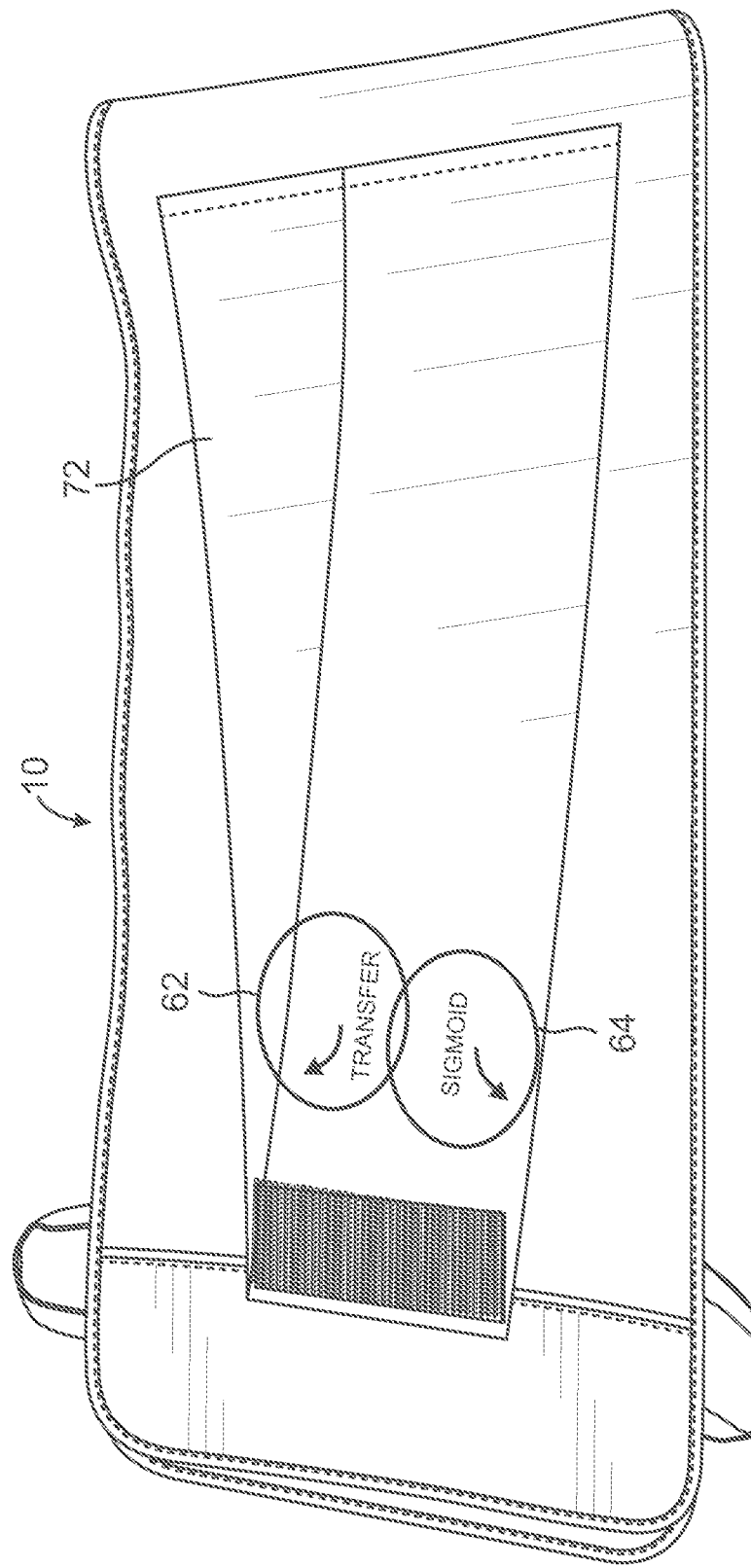
FIG. 6 illustrates a portion of an endoscopy band including visual guides for adjusting directional force with the secondary strap.

FIG. 6 illustrates an example in which a visual guide 60 may be provided on the secondary strap 72 to assist adjustment of the targeted compression or splinting by the secondary strap. A first indicator 62 may indicate the direction in which the secondary strap may be pulled to apply focused compression on the transverse colon. The indicator 62 may include an image, such as an arrow, showing the direction in which the secondary strap 72 is to be stretched, pulled, or moved in order to apply focused pressure on the transverse colon. The indicator 62 may include text that identifies the area of compression or that provides additional assistance in applying the focused pressure. In FIG. 6, the indicator 62 includes an arrow and the text "transverse" that indicates in a simple manner to the technician the way in which the secondary strap is to stretched across the abdomen of the patient and secured to the primary wrap 10 in order to apply focused pressure to the transverse colon. More than one indicator may be provided. For example, FIG. 6 illustrates a second indicator 64 indicating a different direction in which the secondary strap may be pulled to apply focused compression to the sigmoid colon. The indicator 64 may include an image and/or text, similar to the indicator 62. The indicators 62 and 64 in FIG. 6 is merely an example to illustrate the concept, and other images or text description may also be used. Although specific examples have been provided for indicators 62 and 64 for adjustment of targeted compression or splinting of the transverse colon and/or the sigmoid color, indicator(s) may be provided that provide a visual image and/or description that assist in placing the secondary strap 72 to apply compression for other areas involved in an endoscopy procedure, such as the splenic flexure, the hepatic flexure, etc.

As described above, multiple secondary straps may be provided on the device. FIG. 8 illustrates an example on which the indicators 62 and 64 are provided on different secondary straps. For example, the device may include two secondary straps, as shown in FIG. 8. A first elastic strap 72b may extend in the left to right direction from the primary wrap for application of targeted compression to a first abdominal region (e.g., a sigmoid region or other region of the colon) of the subject. A second elastic strap may extend from the primary wrap extending in the left to right direction for the application of targeted compression to a second abdominal region of the subject. The primary wrap may include an upper edge for placement relative to an umbilical line of the subject (e.g., such as shown at 172) and a lower edge for placement below the umbilical line of the subject. The first elastic strap and the second elastic strap may extend from the primary wrap at a same position along the length of the primary wrap. For example, the two secondary straps may be sewn (or otherwise fastened or extending) from a same position along a length of the strap. The first strap may be positioned below the second strap along a width of the primary wrap. For example, as shown in FIG. 8, the first elastic strap may extend from a first position along a width of the primary wrap and the second elastic strap may extend from a second position along the width of the primary wrap, the second position being closer to the upper edge than the first position. The use of multiple secondary straps enables a user to simultaneously apply targeted compression of different abdominal areas, e.g., different regions of a colon (such as the sigmoid and/or transverse regions) during an endoscopy procedure. Similarly, having multiple secondary straps enables an adjustment of the targeted compression for one abdominal region while retaining the targeted compression of the other abdominal region. For example, the technician may apply targeted compression using the first and second strap. During an endoscopy procedure, the technician may adjust the first strap without removing or readjusting the second strap.

Figure 7:
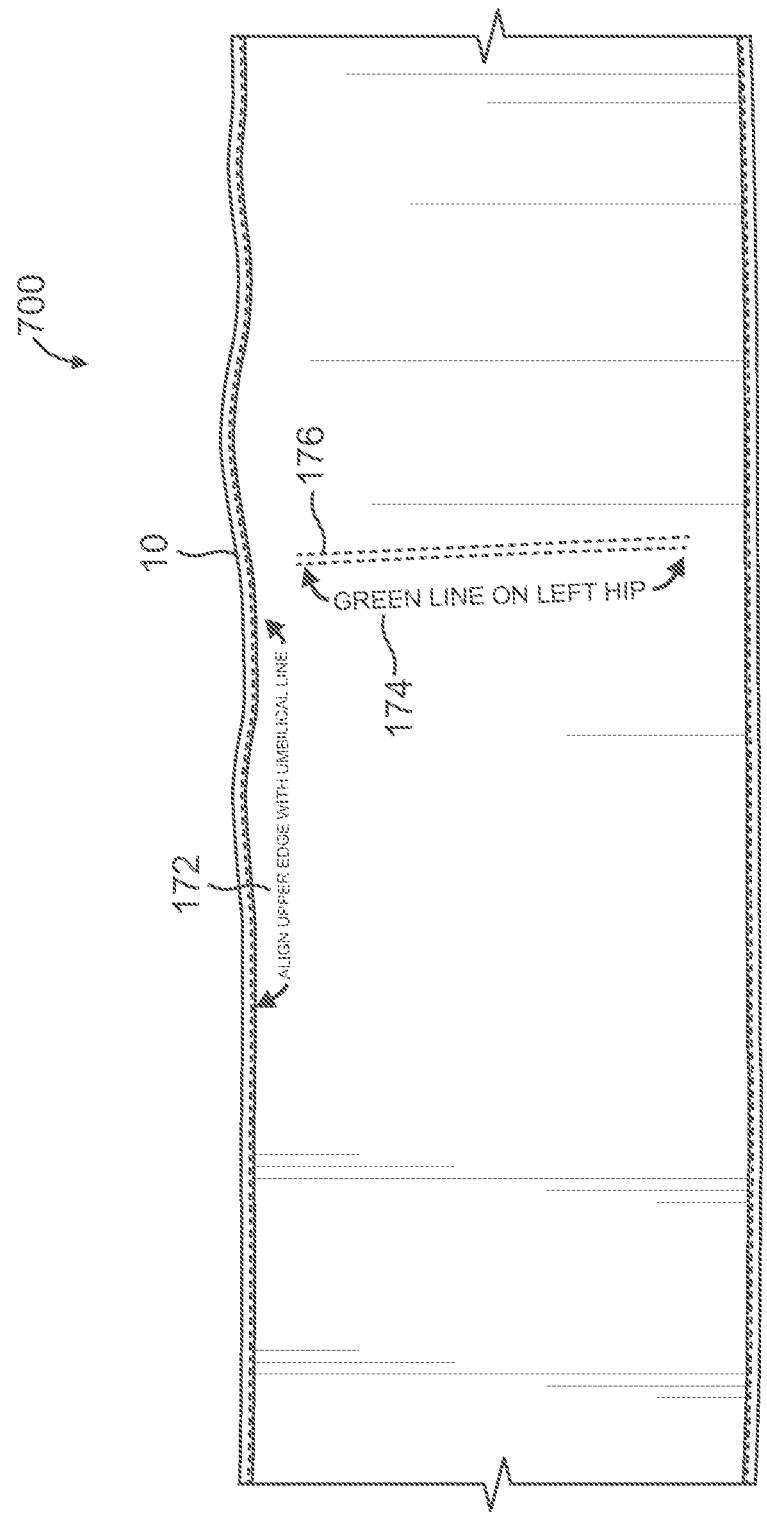
FIG. 7 illustrates an interior of an endoscopy band including visual guides for placement of the band on a patient.

FIG. 7 illustrates an example in which a visual guide or indication may be provided on the primary wrap 10 to assist in placement of the primary wrap on the patient. FIG. 7 illustrates a portion of the primary wrap 10 on a side that is configured for placement against the patient, e.g., which may be referred to as an interior side of the wrap 10. In FIG. 7, a first indicator 172 provides a visual indication to the technician that the correct placement of the device, to assist with an endoscopy procedure, includes aligning the upper edge of the primary wrap 10 with an umbilical line of the patient. The indicator 172 may include an image, such as one or more arrows that show the edge of the wrap 10 to be aligned with the umbilical line of the patient and/or may include text describing the alignment to the technician. For example, in FIG. 7, the text indicates "Align upper edge with umbilical line." The example indicator 172 in FIG. 7 is merely an example to illustrate the concept, and other images or text description may also be used to provide guidance about the placement of the primary wrap relative to the patient. FIG. 7 also illustrates an indicator 174 that provides guidance for placement of the primary wrap 10 on the patient so that the secondary strap is in a position to provide the targeted compression to the sigmoid colon, transverse colon, or other area of the colon. The indicator 174 may include an image, such as one or more arrows that show the portion of the wrap 10 to be aligned with a left hip of the patient and/or may include text describing the alignment to the technician. For example, in FIG. 7, the text indicates "Green line on left hip." The visual indicator may be used in combination with a visual indication of the end of the secondary strap 172 that is fixed to the opposite side of the primary wrap 10. As illustrated in FIG. 7, the stitching 176 that fixes the end of the secondary strap may use a contrasting color to the primary wrap 10 so that the stitching provides a visual reference for the placement of that section of the primary wrap relative to the left hip of the patient. The example indicator 174 in FIG. 7 is merely an example to illustrate the concept, and other images or text description may also be used to provide guidance about the placement of the primary wrap relative to the patient.

Mechanisms for indicating stretch and compression, such as those described in connection, may be provided so that the device includes a mechanism to visually indicate the magnitude of force being applied, such as the mark 80 labeled "Logo" which stretches and deforms when the secondary strap 72 is stretched and fastened. With this mechanism, users may compare the deformed mark with a picture or illustration included in the product instructions or packaging to determine that the device has been applied correctly.

Figure 10:
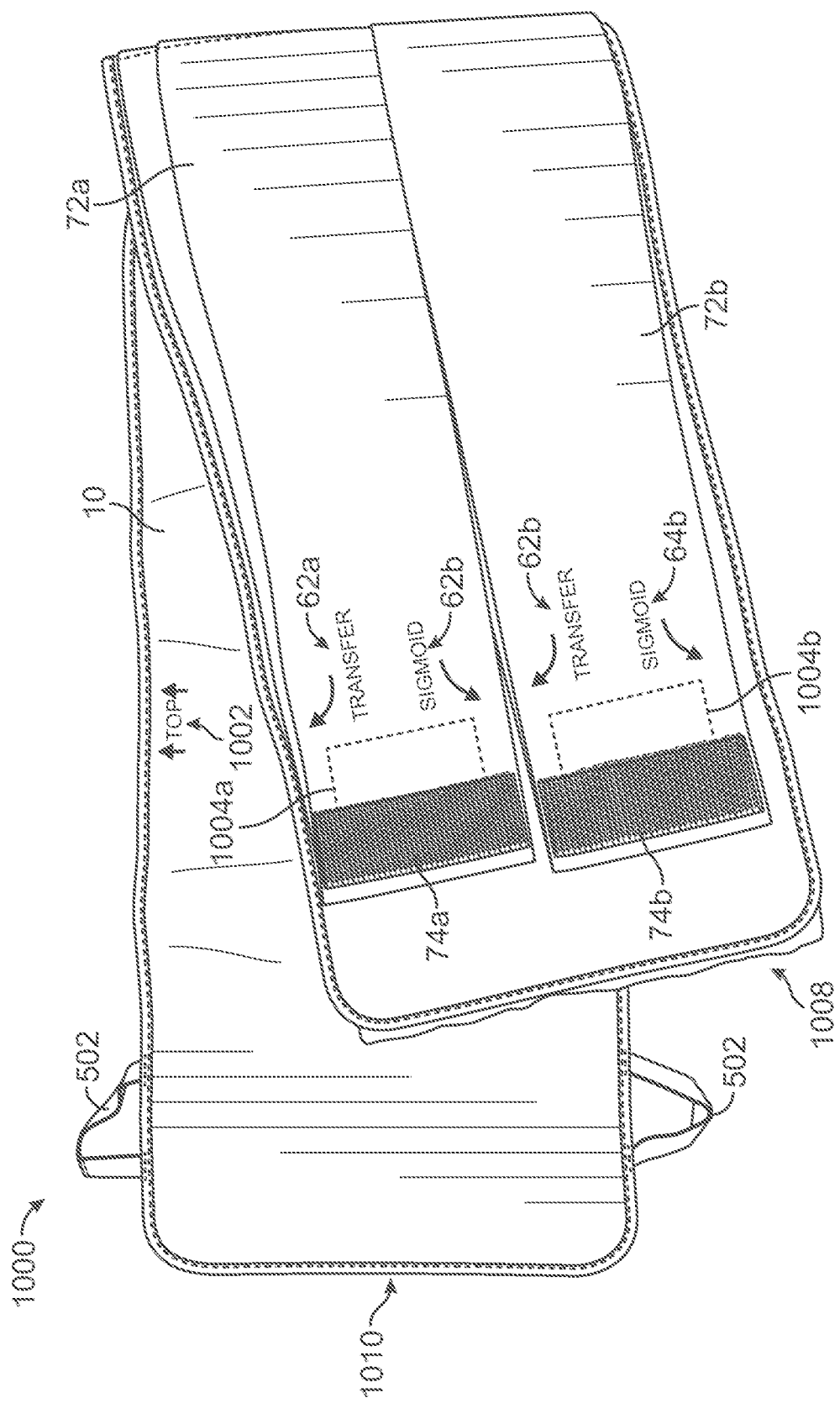
FIG. 10 illustrates an endoscopy band having multiple secondary straps with visual guides for adjusting directional force with the secondary straps.

FIG. 10 illustrates an additional view of a device 1000 including a primary wrap and two elastic secondary straps 72a and 72b. FIG. 10 illustrates that each of the secondary straps 72a and 72b may have a tapered shape and may include a double elastic layer, folded over design, similar to the single strap 72 illustrated in FIG. 4. Alternatively, the two elastic secondary straps 72 and 72b may have a single elastic layer design, such as illustrated for the single strap in FIG. 5. FIG. 10 illustrates an example in which each elastic strap 72a and 72b may include visual indicators showing and/or describing a direction of stretching to apply compression to multiple abdominal areas of a patient, similar to the example for the single strap shown in FIG. 6. For example, the first strap 72a may include a first indicator 62a showing a direction to apply targeted compression to a transverse colon region and a second indicator 64a showing a direction to apply targeted compression to a sigmoid colon region. Similarly, the second strap 72b may include a first indicator 62b showing a direction to apply targeted compression to a transverse colon region and a second indicator 64b showing a direction to apply targeted compression to a sigmoid colon region. FIG. 10 also illustrates stitching 1004a and 1004b, which indicates a placement for a hook and loop material fastener, such as used in VELCRO®, at the movable end of the two straps 72a, 72b. The closing mechanism 74a, 74b may correspond to a handle that enables the technician to stretch and fasten the elastic straps 72a, 72b more easily. In some aspects, a hook and loop material, such as a VELCRO® fastener, may be provided at an interior side of the edge 1008 of the primary wrap, and may be configured to an exterior side of opposite end 1010 of the primary wrap. Thus, the end 1010 may be wrapped under the end 1008 in order to fasten the primary wrap. The handles 502 may be provided on a portion of the primary wrap that is closer to the end 1010, and may be used by a technician to pull the end 1010 further underneath the end 1008 in order to apply a higher level of primary compression through the elastic compression of the primary wrap 10. A visual indicator 1002 may indicate an upper edge of the wrap to assist the direction of placement against the abdomen of a patient.

Figure 11:
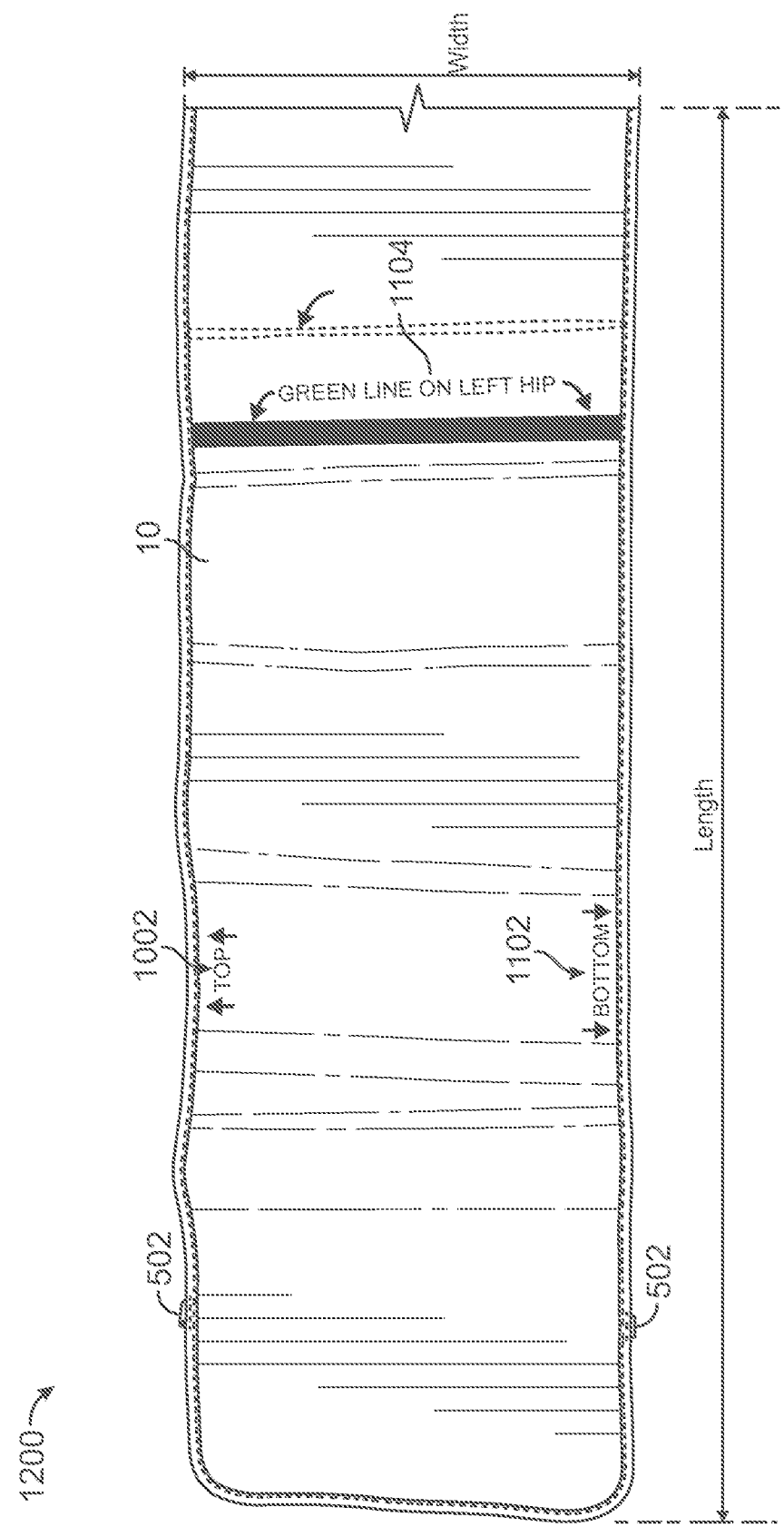
FIG. 11 illustrates an endoscopy band having multiple secondary straps with visual guides for adjusting directional force with the secondary straps.
Figure 12:
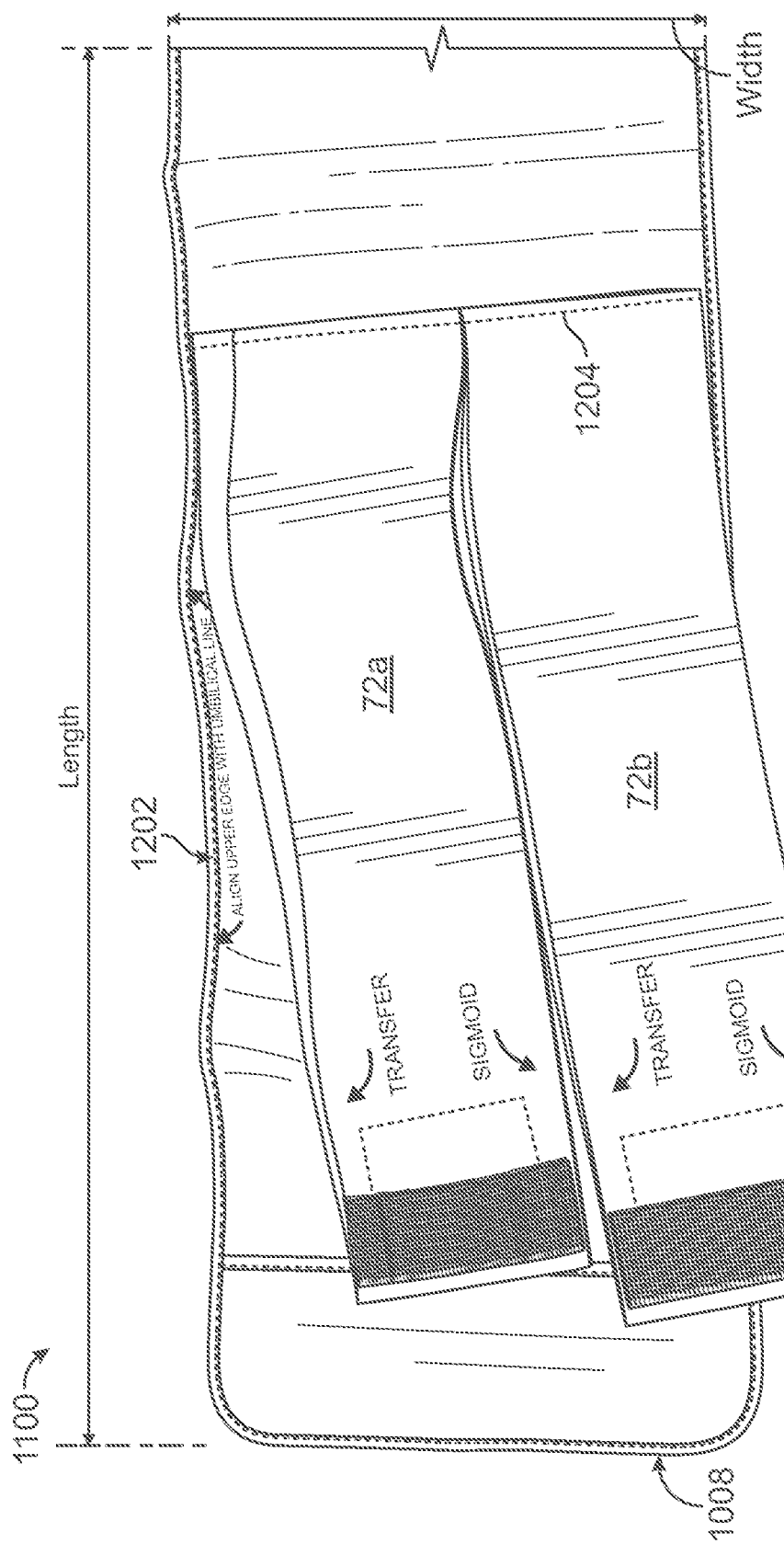
FIG. 12 illustrates an endoscopy band having multiple secondary straps with visual guides for adjusting directional force with the secondary straps.

FIG. 11 shows an interior view 1100 of a primary wrap 10, e.g., a side of the primary wrap that is configured for placement against the patient. In addition to the visual indicator 1002, the primary wrap 10 may further include a visual indicator that indicates a lower or bottom side/edge of the wrap. The top/bottom indicators may be helpful to avoid applying the primary wrap in the opposite direction. If the bottom edge is applied above the top edge, the secondary straps 72a, 72b will extend in the opposite direction and may not provide the targeted compression to the appropriate areas of the patient's abdomen. Additionally, a visual indicator 1104 may be provided to indicate correct placement along a width of the primary band. The example in FIG. 11 provides a line as a visual indicator with respect to the patient's left hip. The indicator may further include one or more arrows and text. Although the example in FIG. 11 uses a green line, the concepts may be applied for an indicator of a different color, a dashed line, a double line, a visual marker that is different than a line, etc. The visual indicator may help a technician to properly place the primary wrap to the patient so that the secondary straps are in the appropriate location to apply targeted compression to particular areas of the abdomen, such as to a sigmoid colon region or to a transverse colon region, among other examples of regions. FIG. 12 illustrates an exterior view 1200 of a portion of the primary wrap and shows that a visual indicator 1202 may be provided on the exterior of the wrap. In FIG. 12, the visual indicator 1202 assists the technician in placing the primary wrap having the upper edge near the umbilical line. The visual indicator may be placed to line up with a front abdominal region of the primary wrap when the wrap is properly placed (e.g., following the visual indicators on the interior of the primary wrap) and may enable a technician to view the alignment of the visual indicator, e.g., relative to the patient's navel, before or at the time of fastening the closure of the primary wrap. FIG. 12 also illustrates that the straps 72a, 72b may be coupled to the primary wrap at a same position along a length of the primary wrap 10. For example, FIG. 12 illustrates stitching 1204 attaching the fixed end of the straps 72a, 72b to the primary wrap 10.

In some examples, one vertical side of the secondary strap may be fixed to the primary wrap, and the other side may be removably fastened to the primary wrap, such as through a hook and loop closure, such as used in VELCRO®. In other examples, the secondary strap 72 may be fully detachable from the primary wrap, and may have fastening mechanisms at both ends that allow the strap to be secured the exterior side of the primary wrap. The secondary strap in this aspect may be either re-usable or disposable, and may be capable of being stretched and maintaining tension, or may use another mechanism to exert compressive force, when it is secured to the primary band. The strap in this example might not wrap fully around the patient but instead may be stretched directly about the location on the patient's body where force is desired. The strap may be equipped with fastening mechanisms on each end, e.g., to allow the strap to adhere directly to the patient's body.

In some aspects, one or more extension pieces for an abdominal compression device may be provided to allow for an adjustable size compression device for which the primary band and/or the secondary straps may be adjustable in length through the attachment of an extension piece that is configured to removably couple to the primary band or a secondary strap.

Figure 14:
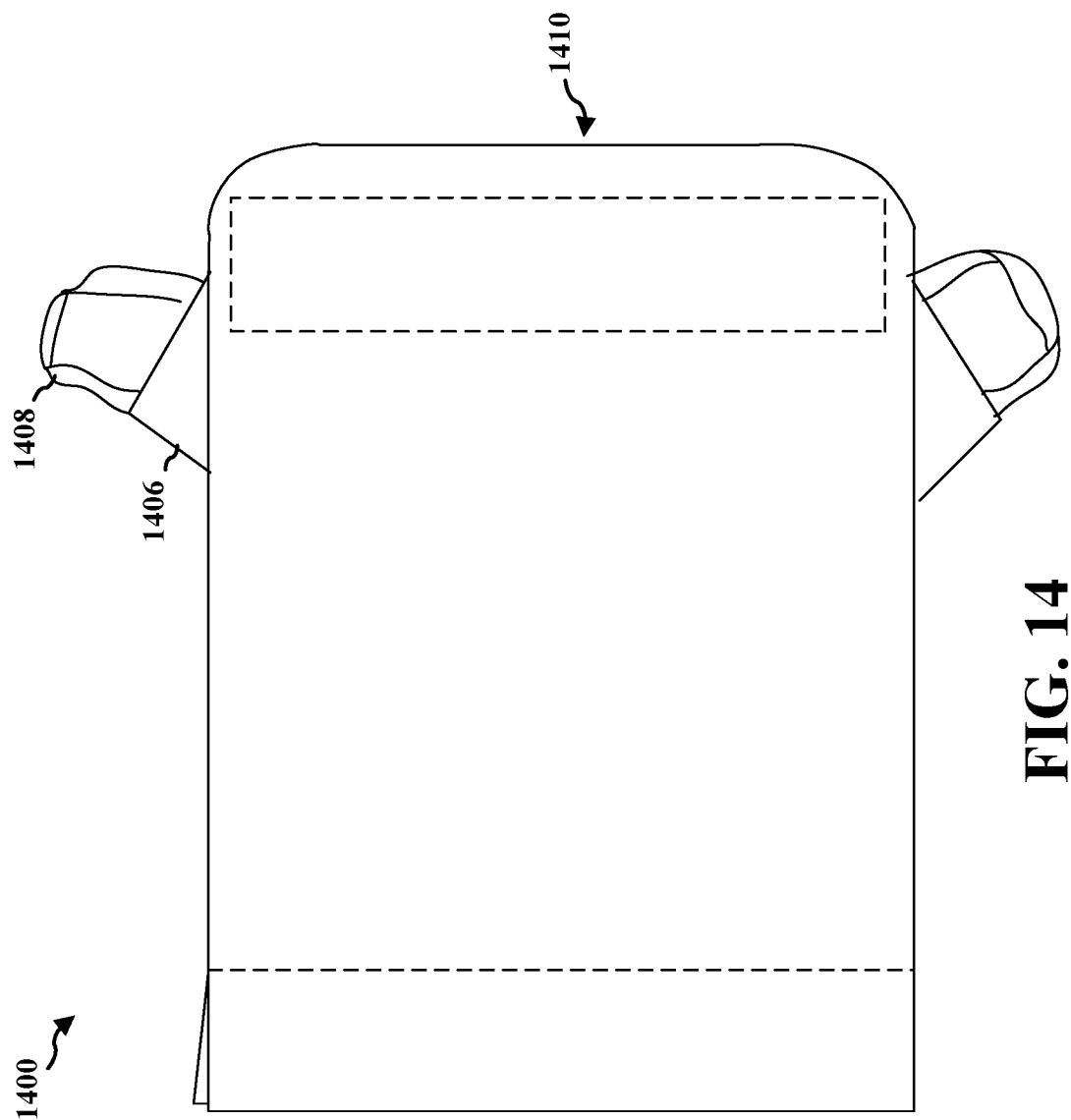
FIG. 14 illustrates an example extension component for extending a length of a primary wrap of an endoscopy band.
Figure 15:
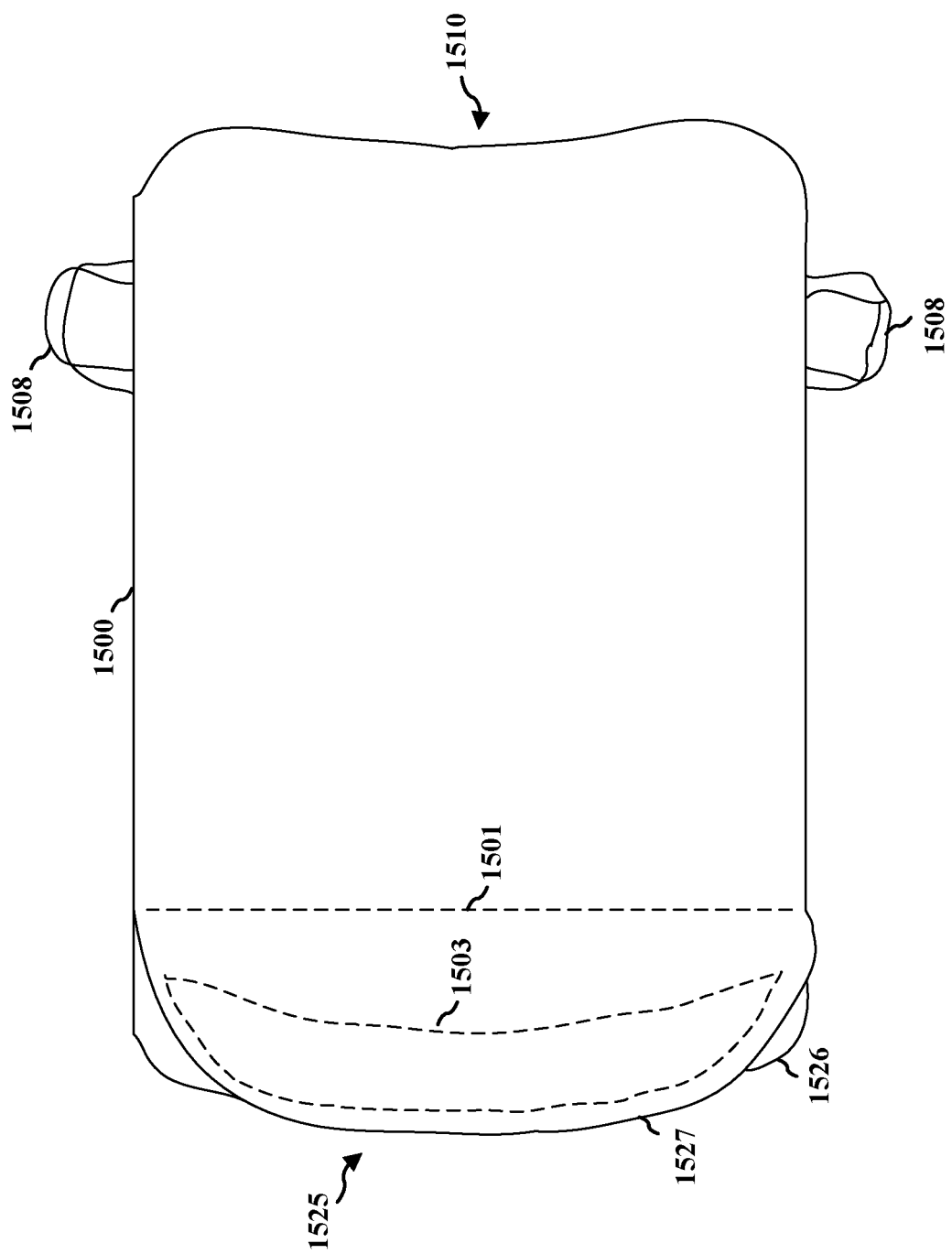
FIG. 15 illustrates an example extension component for extending a length of a primary wrap of an endoscopy band.

FIG. 14 illustrates an example extension piece 1400 that is configured to removably couple or removably fasten to a primary wrap, e.g., such as 10, 1002, 1202, or 1302. FIG. 14 illustrates that the extension piece 1400 may include loops 1408 or handles, such as described for the primary in connection with FIG. 5 or FIG. 13. In FIG. 14, similar to FIG. 13, the loops 1408 are shown as being provided at an extension 1406 that extends from an edge to position the loops 1408 or handles at an angle relative to an edge (e.g., an edge that is configured to be parallel to the edge along the length of the primary wrap when coupled to the primary wrap) of the extension piece 1400. FIG. 15 illustrates an additional example of an extension piece 1500 that is configured to be removably coupled to the primary wrap. FIGS. 14 and 15 illustrate that various shapes may be used for an end (e.g., 1410 and 1510) of the extension pieces 1400 and 1500. In FIG. 14, an example edge 1410 is illustrated having a straight shape, whereas the edge 1510 in FIG. 15 includes a curved shape. FIG. 15 also illustrates that loops 1508 or handles may be provided without the extension piece 1406 shown in FIG. 14. In some aspects, having loops 1508 without the extension piece may simplify production while still providing the added assistance in application of the abdominal compression device. FIG. 23 illustrates a diagram 2300 showing an extension piece 1400 applied to the primary wrap 10. Multiple extension pieces 1400 may be applied, e.g., iteratively, to extend the primary wrap to a specific length. For example, the end/side of the extension piece that is opposite a fastening portion (e.g., 1525) may be shaped or configured to allow a fastening portion (e.g., 1525) of a second extension piece 1500 to be removably fastened to the first extension piece.

Figure 16:
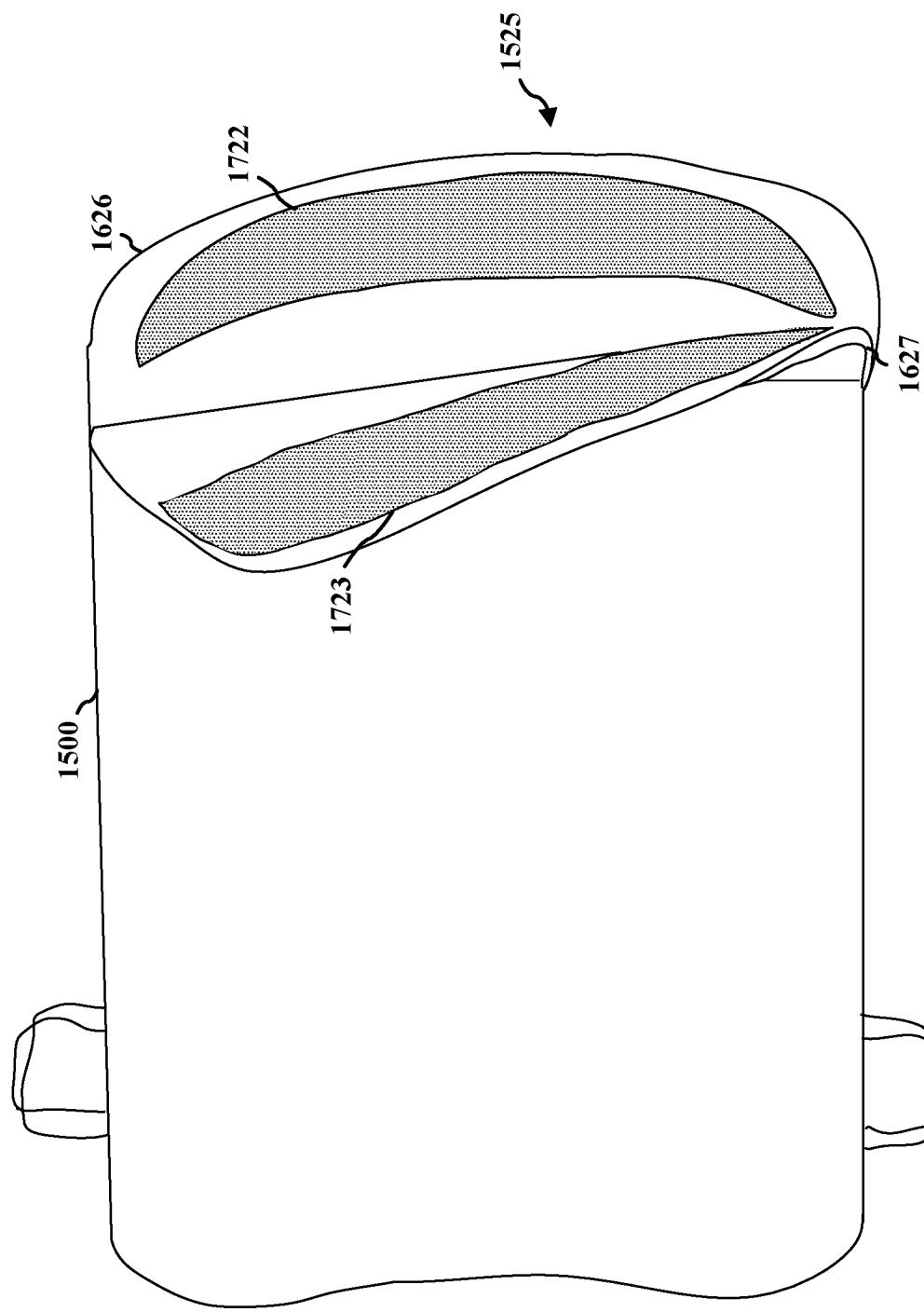
FIG. 16 illustrates an example extension component for extending a length of a primary wrap of an endoscopy band.

FIG. 15 illustrates a fastening portion 1525 at an edge of the extension piece 1500. As shown in connection with FIG. 16, the fastening portion 1525 includes two separable portions 1626 and 1627 (e.g., which correspond to 1526 and 1527), which are configured to receive an end of the primary wrap (e.g., the edge opposite the edge 12 of the primary wrap) between the two separable portions. In some aspects, the extension piece may be configured to removably attach to the edge 12. The fastening portion 1525 includes a fastener, or fastening mechanism, to hold the end of the primary wrap within the two separable portions of the extension piece 1500. Dashed lines 1501 corresponds to an example placement for stitching that connects at least one of the pieces 1526 or 1527. Dashed lines 1503 illustrate example stitching for connecting a section of hook or loop type material to the interior of the piece 1527 to fasten the primary band within the pieces. As an example, the fastening portion 1525 may be referred to as an alligator type closure having two pieces that may be separated to receive an end of the primary wrap. Interior portions of the two pieces may include a hook or loop type material that is configured to fasten to a corresponding material at the end of the primary wrap. In some aspects, a hook type material may be provided at an interior side of one or more of the pieces 1626 and 1627, e.g., as shown at 1722 and 1723). The interior side may refer to the side that faces the opposite piece of the fastening portion 1525. The end of the primary wrap may include a corresponding loop material one or more sides of the portion that is configured to be received between the two pieces 1626 and 1627. In some aspects, a hook type material may be provided at an interior side of both of the pieces 1626 and 1627, and the primary wrap may include a loop material on both sides of the portion that is configured to be received between the two pieces 1626 and 1627. Providing the two separable pieces 1626 and 1627, between which the end of the primary wrap is received, and each piece having a hook material that removably fastens or couples to the loop material on each side of the primary wrap enables the primary wrap to be fastened to the extension piece in a secure manner than will maintain the connection while the compression device is stretched and applied around an abdomen of the patient and used to apply the compression throughout an endoscopy procedure. FIG. 16 shows an opposite side of the extension piece 1500 than FIG. 15.

Providing the hook type material on the interior side of the two pieces of the fastening portion helps to avoid the potential for contact with patient skin and potential irritation. As well, providing the hook type material on the interior side enables the end of the primary wrap to have the corresponding loop material. If an extension piece is not applied to the primary wrap, the use of the loop material reduces the potential for irritation of a patient's skin due to contact with the hook material or accidental snagging of unintended fabrics.

Although a hook and loop fastener, such as a VELCRO® type material, is described as one example, other fasteners may also be used. As another example, one or more snaps may be provided at the fastening portion to allow the extension piece to be removably coupled to the primary wrap. As another example, an adhesive may be provided on the interior sides of the pieces 1626 and 1627 and used to adhere the extension piece to the primary wrap.

FIGS. 17A, 17B, 17C, 17D, and 17E illustrate an example of an extension piece being coupled to a primary wrap. FIGS. 18A, 18B, 18C, 18D, and 18E similarly illustrate a side view of the extension piece being coupled to a primary wrap. The dimensions and thicknesses of the components illustrated in FIGS. 17A-D and 18A-E are not to scale in order to illustrate the interaction between the various components of the device.

FIG. 17A illustrates a diagram 1700 showing an extension piece 1720 having loops 1708 (e.g., which may correspond to 1408 or 1508) and having two pieces 1726 and 1727 that are configured to receive and fasten to an end of a primary wrap of an abdominal compression device. As illustrated in FIG. 17A, in a resting position, the two pieces 1726 and 1727 may remain in a closed position with the fastener between the two pieces 1726 and 1727. The dashed line 1721 illustrates an example point at which a unitary piece of the extension may separate into two pieces that provide a fastening end of the extension 1720. In some aspects, the dashed line 1721 may correspond to a sewing line at which one or both of the two pieces 1726 and 1727 are sewn to, or otherwise permanently attached to, the unitary portion of the extension 1720. In some aspects, one piece may be a portion of the unitary piece of the extension 1720, and the second piece, e.g., 1727, may be sewn to, or otherwise attached to, the unitary piece of the extension over the portion that forms the first piece. In some aspects, the two pieces may be formed at the end of the material of the extension piece, or the two pieces may be sewn or otherwise permanently attached as a component of the extension piece. In some aspects, one piece may be formed as an integral portion of the material of the extension piece, and the second piece may be sewn or otherwise attached as a component of the extension piece.

Figure 18E:
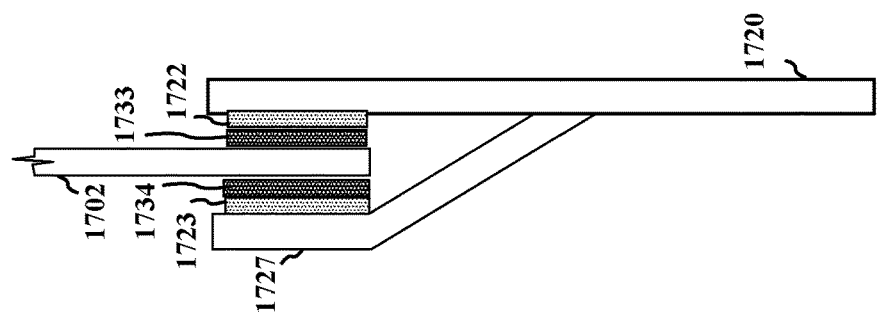
FIGS. 18A, 18B, 18C, 18D, and 18E illustrate aspects of an extension component for a primary wrap and a manner of coupling applying the extension piece to the primary band.
Figure 18D:
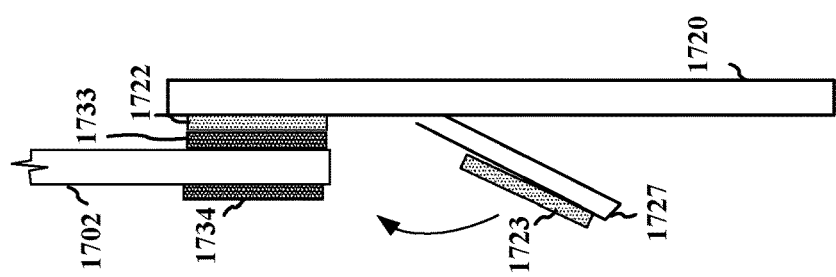
Figure 18C:
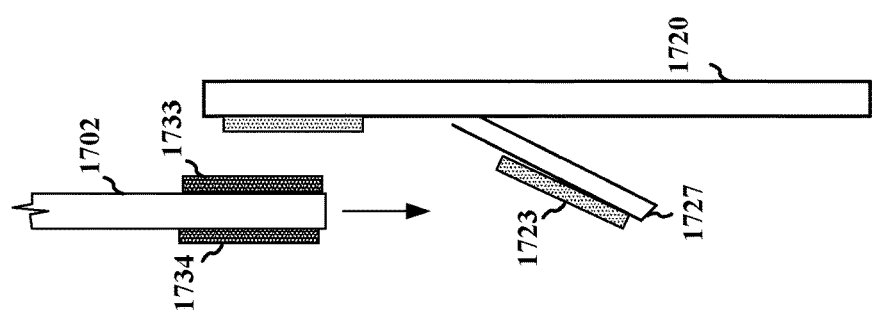

FIG. 17B is a diagram 1750 that illustrates the two pieces 1726 and 1727 in an open, or separated position, and illustrates a hook material 1722 and 1723 provided on the internal side (e.g., the side facing the opposite piece) of each piece 1726 and 1727 of the extension. FIG. 17C is a diagram 1760 showing an edge of the primary wrap 1702 being moved toward the fastening end of the extension piece 1720. FIG. 17C only illustrates a portion of the primary wrap, and the full primary wrap may include the additional aspects described in connection with any of FIGS. 2-13. FIG. 17C illustrates that a loop material 1733 is provided at an end of the primary wrap 1702 that is received between the two pieces 1726 and 1727 and has a placement corresponding to the corresponding hook material 1723 at the fastening end of the extension piece 1720. Although only one side of the primary wrap is visible, the loop material may also be provided at the opposite side, e.g., in a position to align with the hook material 1722 on the first piece 1726 of the extension. As shown in FIG. 17C, the loops 506 on the primary wrap may be positioned behind the loop material 1733 (and corresponding loop material on the opposite side which is not visible) so that the finger loops are not inadvertently caught in the hook material of the extension piece. FIGS. 18C-18E illustrate a side view showing the loop material 1734 on the opposite side of the primary wrap.

FIG. 17D is a diagram 1770 showing the primary wrap positioned at the fastening end of the extension piece between the two pieces 1726 and 1727. In FIG. 17D, the second piece 1727 is in an open position, and the loop material (e.g., 1734) on the opposite side of the primary wrap may be aligned with and removably fastened to the hook material 1722 of the first piece 1726, e.g., by pressing the two pieces together. FIG. 17E is a diagram 1780 showing the extension piece 1720 fastened to the primary wrap 1702 and having the second piece 1727 closed over the loop material 1733 on the primary wrap 1702. The second piece 1727 may be fastened to the primary wrap by pressing the hook material 1723 and the loop material 1733 together removably coupling the primary wrap between the two pieces, e.g., 1726 and 1727, of the extension 1720.

Figure 24A:
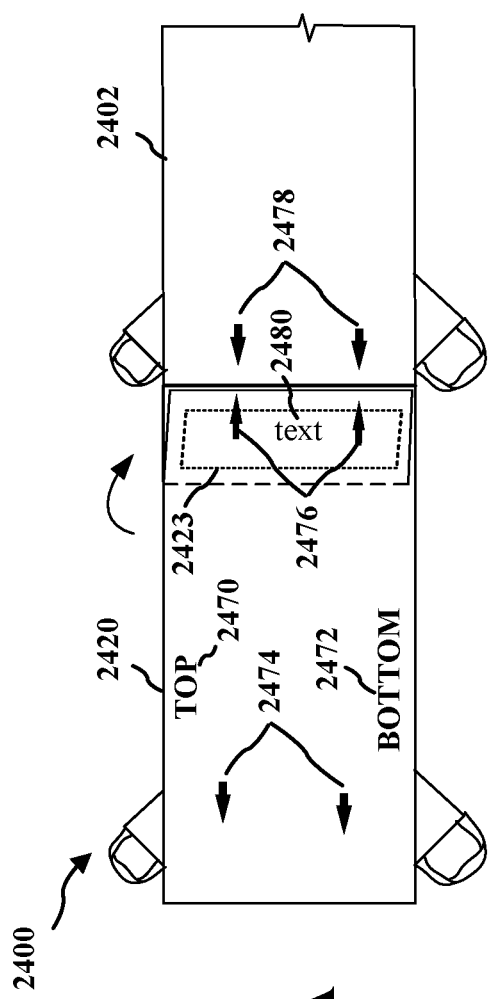
FIG. 24A illustrates a portion of a primary wrap for an endoscopy band having an extension piece attached to an end of the primary wrap, the extension piece having visual indicators for alignment with the primary wrap.
Figure 24B:
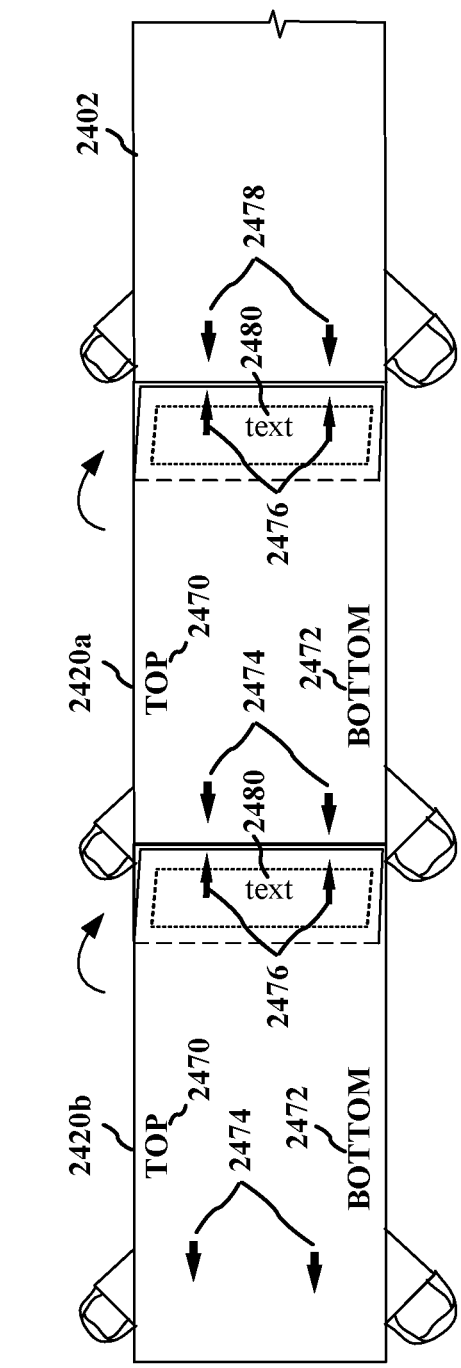
FIG. 24B illustrates a portion of a primary wrap for an endoscopy band having multiple extension pieces attached to an end of the primary wrap, the extension pieces having visual indicators for alignment.

In some aspects, the extension piece and/or the primary wrap may include visual indicators, markers, or guides to assist in correct placement and/or alignment of the extension piece relative to the primary wrap. FIG. 24A illustrates an example 2400 of an extension piece 2420 applied to an end of a primary wrap 2402, e.g., showing the region of the hook material 2403 similar to the examples in FIGS. 17A-E. FIG. 24B shows that multiple extension pieces 2402a and 2402b may be applied to the primary wrap 2402 in order to provide further extension. In some aspects, each extension piece may include a further visual indicator, e.g., 2474 that illustrates correct alignment or positioning relative to an additional extension piece. The extension piece may be configured to be modularly applied, which allows the device to be extended in a clinical setting to provide a more personalized fit to different sizes of patients. The extension piece is configured so that it can be applied either before primary band has been placed around a patient. As an example, by coupling to the illustrated end of the primary wrap, the extension can be applied after the start of a procedure and when the patient may be sedated, if the primary band appears to need an extension.

The modular aspect allows for the primary band to be extended independently of the secondary straps. As well, one secondary strap can be extended independent of the other secondary strap. The modular design, which allows for separate extension of various components of the compression device enables the customization of the device to the particular body shape or procedural needs of individual patients. The modular extension pieces provide added flexibility and individualized adjustment of the device for different anatomical structures of various patients, in order to provide a more consistent effect from the compression provided by the device. The extension pieces are configured to maintain the consistent compression across the extended device, without inflection points or zones of acute pressure, in order to avoid discomfort to a patient on which the device is applied.

In some aspects, the extension pieces for the secondary strap may be configured to maintain a more consistent ratio of strap extension to compression. As an example, longer secondary straps may be stretched more in order to apply a similar amount of compression as a shorter strap. As the extension piece for the secondary strap is shorter, the combination of a longer secondary strap and a shorter extension piece may affect the compression of the combined secondary strap.

FIG. 24A also shows a visual marker, indicator or guide 2478 on the primary wrap 2402 and a corresponding visual marker, indicator or guide 2476 on the extension piece 2420, which the user may align to ensure correct placement of the extension piece. Although FIG. 24A shows an example of a set of visual guides 2476/2478, in other aspects, a single visual guide or three or more visual guides may be used to visually show the user the correct alignment of the extension piece 2420 with the primary wrap 2402. As well, although the example in FIG. 24A illustrates arrows as the example visual guides 2476/2478, any visual indicator may be used, such as dots, text, matching symbols, images, a line pattern, etc.

Figure 25:
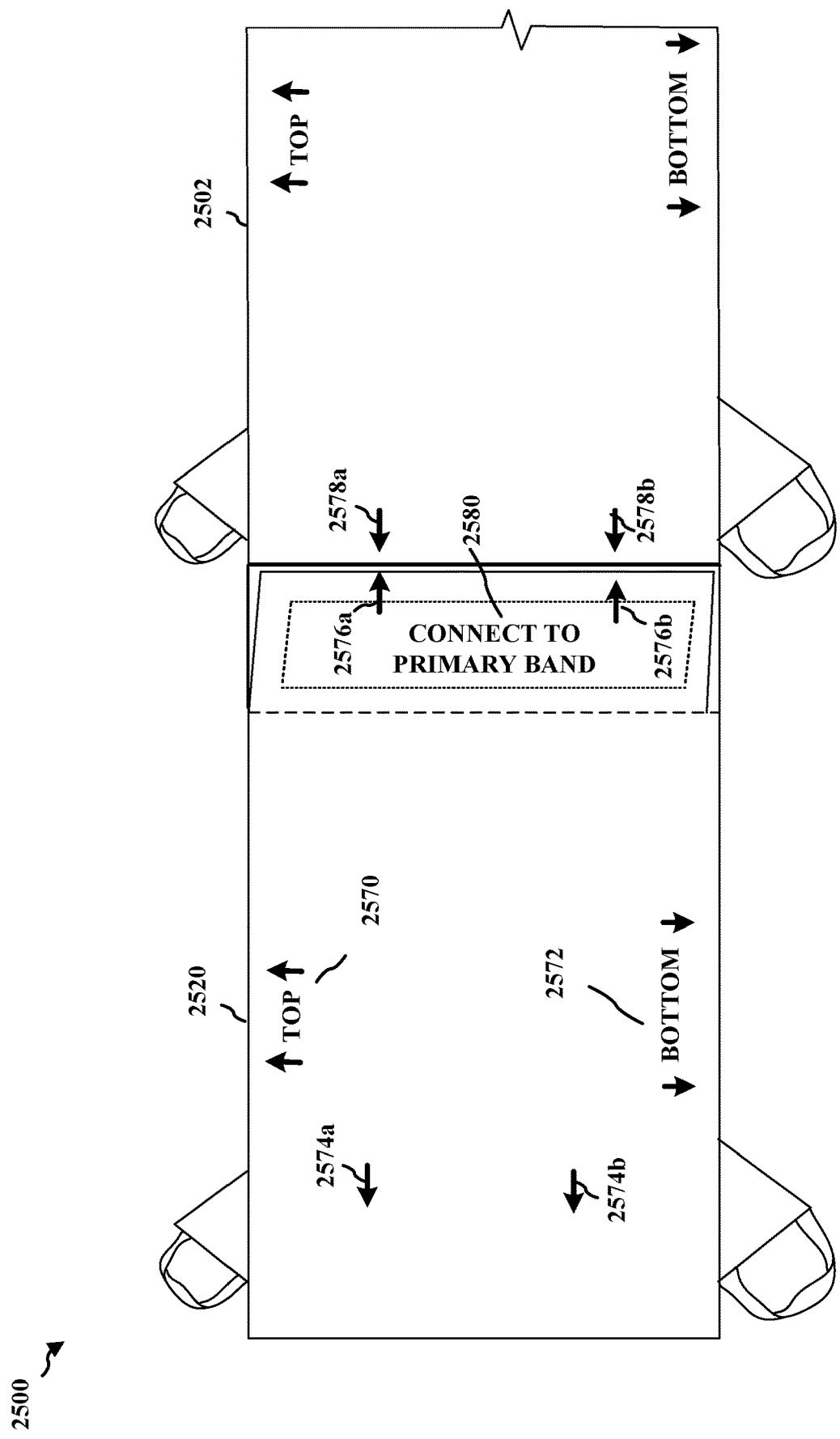
FIG. 25 illustrates a photo of a portion of a primary wrap for an endoscopy band having an extension piece attached to an end of the primary wrap, the extension piece having visual indicators for alignment with the primary wrap.

The visual indicator may further include text, such as 2480, 2470, and/or 2472 that provides further instructions to the user in the correct alignment of the extension piece 2420 with the primary wrap. For example, the visual indicator may indicate a top and/or bottom of the extension piece. The text 2480 may indicate that the end of the extension piece 2402 is to be attached to the end of the primary wrap. In some examples, the text 2480 may indicate "connect to primary band," "primary band," "primary band side" or some other text that indicates the end of the extension piece that is intended to be attached to the primary band 2402. FIG. 25 illustrates an example photo of an extension piece 2520 with examples of visual indicators. The extension piece 2520 is attached to an end of the primary wrap 2502, a portion of which is shown. FIG. 25 illustrates an example of a corresponding set of arrows (e.g., 2576a and 2578a and 2576b and 2578b), as an example of visual markings, that assists the user is connecting the extension piece to the primary wrap 2502 correctly. FIG. 25 also illustrates printed text 2580 as a label indicating to the user the correct end to be connected to the primary band 2502. Additional text and arrows are illustrated at 2570 to show the top edge/direction for the extension 2520, and at 2572 to illustrate the bottom edge/direction for the extension 2520. In some aspects, the primary band 2502 may include similar visual markings, such as text or arrows, e.g., as shown at 2573 and 2574 to show a corresponding top and bottom edge of the primary wrap. The visual markings may assist in proper placement of the extension relative to the primary band 2502 and may further assist in proper placements on a patient.

The visual indicators or visual guides may be provided on a single side of the primary wrap 2402 and a single side of the extension piece 2420, in order to visually indicate an alignment between the corresponding sides of the primary wrap and the extension piece. In the example in FIG. 24A, the visual guides may be provided at an interior side of the primary wrap and extension piece that are intended to be placed against the patient during application of the endoscopy band.

The visual indicators may assist in the proper placement of the extension piece to the primary wrap, e.g., so that the hood material of the extension piece is in a proper position to be applied to the primary wrap in order to apply compression via the endoscopy band. As a patient may be sedated during a procedure, it may be difficult to reapply the endoscopy band or to change the attachment of the extension piece at a later point in a procedure. The visual indicators help to ensure proper placement of the extension to the primary wrap and help to avoid readjustments of the extension piece at a later point during a procedure.

Often an endoscopic procedure is performed in an operating room or other room under low light conditions. A user may attempt to apply the compression device and/or adjust compression by adjusting one or more secondary straps or the primary band in such low light conditions. In some aspects, one or more visual indicators on the endoscopy compression device may configured to assist in a low light condition. Visual indicators may be provided to assist with proper placement of the device and/or adjustment of compression. As well, visual indicators may be provided to highlight certain useful features of the device in a low light setting. The visual indicator may include a high-visibility element that helps to highlight application and/or adjustment features in dark settings that are common to rooms where such procedures occur. As examples, the high-visibility element may be included as a part of a secondary strap, or other secondary adjustment lever, a handle, text or arrows showing proper placement, etc.

The use of external abdominal compression to facilitate insertion and advancement of an endoscope into and through the bowel can be very important. The basis for the application of abdominal pressure during insertion is to support and provide counter-pressure to the colon to reduce the formation of loops that hinder the advancement of the scope to the cecum. This need is obviated, however, during the withdrawal phase as loops are naturally reduced by the motion of the scope being withdrawn from the body. Aspects presented herein provide an improvement in visualization of the adjustment features of the endoscopic abdominal compression band.

Aspects include providing a reflective coating or fabric to the handles of the fabric-based apparatus to help highlight key adjustment features of the compression band. Allowing for increased visibility to these key adjustment features will help facilitate colonoscopy procedures via faster procedure times, lower or less usage of anesthesia, and higher rates of adenoma detection. By increasing low-light visibility for features of a compression device intended to facilitate a colonoscopic examination via providing pressure to the abdominal wall, such as highlighting the secondary adjustment levers or straps of an abdominal compression bad, will increase the effectiveness and ease of use of the compression device during such procedures, resulting in more efficient procedures on behalf of the practitioners and better patient care.

The high-visibility visual marking may be provided as one or more of high visibility yarn, a topical treatment, or a laminated coating or coated material used as an element to provide better visibility to specific portions of the colonoscopy abdominal tensioning band in low light or dark rooms. As an example, a reflective or retro reflective element may be included to highlight one or more features of the compression device. A retro reflective material may include materials that reflect light back toward a light source from a wider angle with reduced scattering than a reflective material. The retro reflector's reflection is brighter than a more diffuse reflection of a reflector. By reducing scattered light, a retro reflective material can enhance a contrast with a non-retro reflective material.

Figure 26:
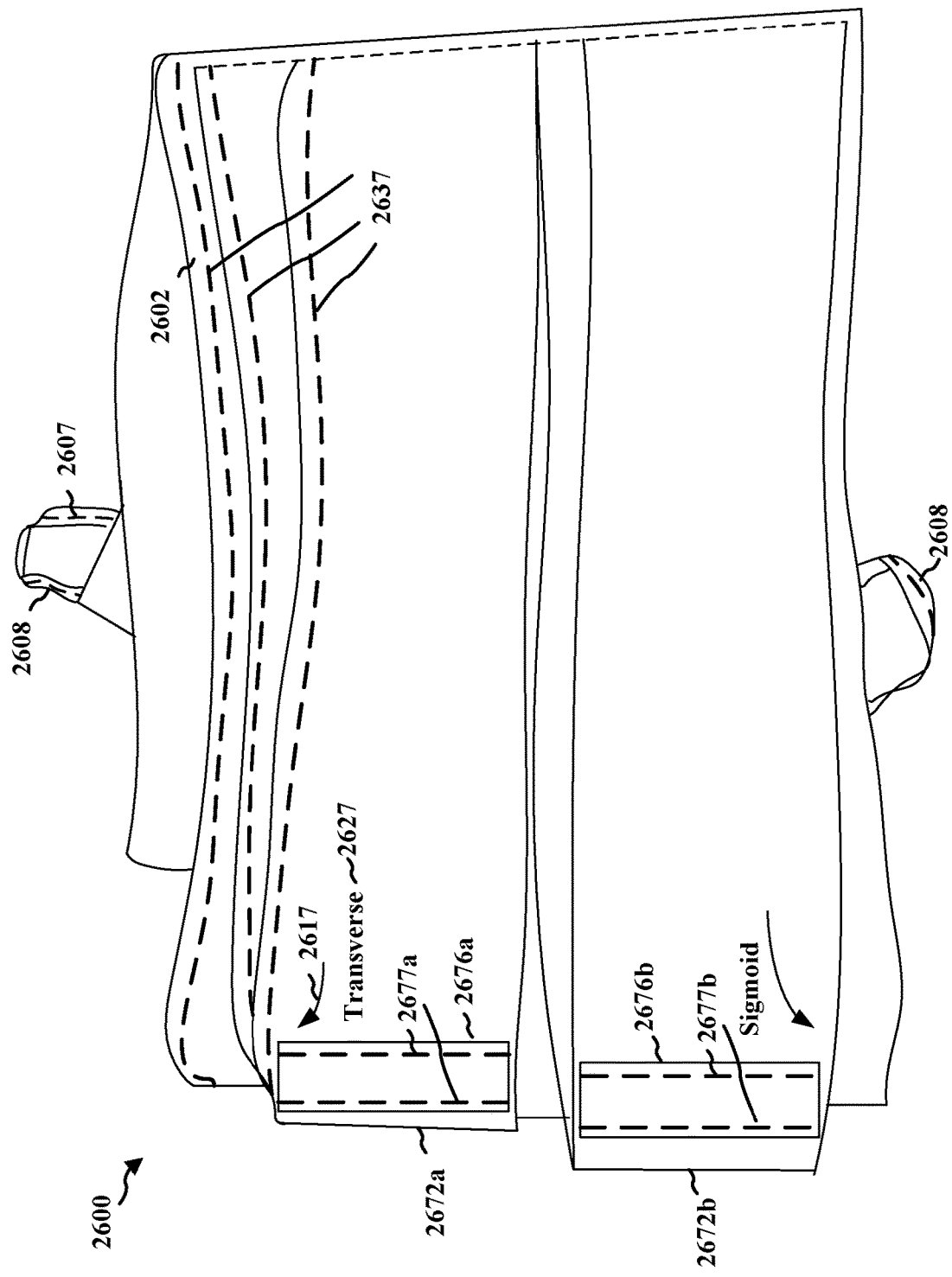
FIG. 26 illustrates an endoscopy band as an example of a medical device having high-visibility markings to assist in application and/or adjustments during a procedure conducted in a low light setting.

FIG. 26 illustrates an example view of an endoscopy compression device 2600 including high-visibility indicators for a low light setting during an endoscopy procedure. In FIG. 26, the secondary straps 2672a and 2672b have a handle 2676a and 2676b. The handles are shown having a high-visibility stitching 2677a and 2677b, e.g., which may include a retro reflective or other high visibility material woven or sewn into the material of the handle 2676a and 2676b. As an example, a reflective or retro reflective yarn or thread may be sewn along each edge of the handle to highlight the handle's presence to a user when applying or adjusting the compression in a low light setting. In some aspects, the entire handle 276a and 276b may be formed of a high-visibility material, such as a reflective/retro reflective material. The handle may be woven from a reflective/retro reflective yarn. The handle may have a printing or other textile finishing process applied to form lines along the edge of the handle or across the top of the handle. A line near the edge of the handle may assist a user in finding the edge of the handle in the low light setting.

FIG. 26 also illustrates that features of the primary band 2602 may include high-visibility features. As an example, the loops 2608 may include a high-visibility marking 2607, such as reflective/retro-reflective marking, printing, yarn, material, stitching, etc. applied to or incorporated into the loop. The high-visibility marking assists a user in finding and using the loop in a low light setting. By highlighting the loops 2608, the user is more likely to find and use the loop, which can reduce user injury and improve the application of compression to the patient.

Text, arrows, or other visual indicators that have been described herein may be printed, sewn, or formed of a high-visibility material, such as a reflective or retro reflective material. As an example, the text 2627 or arrow 2617 may be printed with a retro reflective material so that the visual guides can be readily seen by the user during the endoscopy procedure, which may be conducted under reduced lighting conditions. Any of the marking or features described in connection with 80, 76, 14, 502, 12, 62, 64, 172, 174, 176, 1002, 1102, 1104, 1202, 1308, 1408, 1501, 1503, 1722, 723, 1904, 1907, 1909, 1915, 2480, 2470, 2472, 2476, 2478, 2570, 2572, 2574a, 2574b, 2576a, 2576b, 2578a, 2578b, 2617, 2627, 2637, 2667a, 2667b, 2677a, 2677b, etc. may be formed of a high-visibility materials such as printed in high-visibility ink, sewn with high-visibility thread such as with a retro reflective ink or thread, as described in connection with FIG. 26. FIG. 26 illustrates that high visibility stitching or marking may be applied along the edges of features such as the edge of a secondary strap or of the primary band, which may assist a user in finding the primary band and/or secondary strap. In some aspects, a high visibility marking, such as a reflective/retro reflective outline, text, arrow, shading, etc. may be included at an fastening area for a hook and loop fastener. As an example, a loop fabric section of the compression device, which is intended to receive a hook type fastener of the secondary strap, etc., may be highlighted with high visibility marking.

A compression device for an endoscopy procedure is one example of a medical device that may be used in low light settings and to which high visibility features can be applied to assist a user in applying, adjusting, or using the medical device under low light settings. The high-visibility aspects presented herein can also be applied to other medical devices. As described in connection with FIG. 26, the high-visibility features may include reflective or retroreflective stitching, yarn, or printing that highlights one or more components, aspects, features, or operations of the device.

Figure 18B:
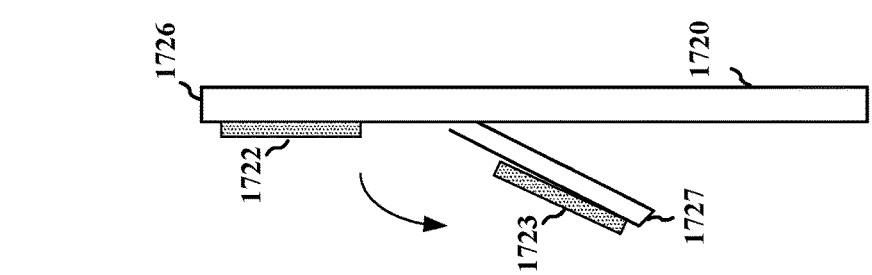
Figure 18A:
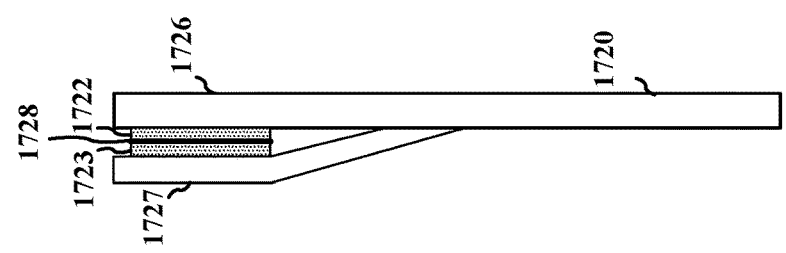

FIGS. 18A-18E illustrate a side view of an extension piece 1720 being coupled to a primary wrap 1702, e.g., as described in connection with FIGS. 17A-17E. In some aspects, a liner or protective layer 1728 may be provided over the hook material prior to use. As an example, a layer 1728 may be provided over the hook material 1722 and 1723 at each side of fastening end. The layer 1728 may include an adhesive that holds the layer to the hook material or may adhere to the hook material based on the hook design. FIG. 18A shows the two pieces 1726 and 1727 of the extension 1720 in a closed position without the primary wrap. A user may separate the two pieces 1726 and 1727, as shown in FIG. 18B and remove the layer 1728 prior to removably attaching the extension 1720 to the primary wrap 1702. FIG. 18C illustrates the primary wrap 1702 being moved into a position to align the loop material 1733 and 1734 with the hook material 1722 and 1723 of the extension piece. At 18D, the loop material 1733 is aligned with the hook material 1722 and may be removably fastened or coupled by pressing the two materials towards each other. In FIG. 18E, the second piece 1727 is closed over the primary wrap. The hook material 1723 is aligned with, and may be pressed together with, the loop material 1734 provided on the primary wrap.

Figure 19:
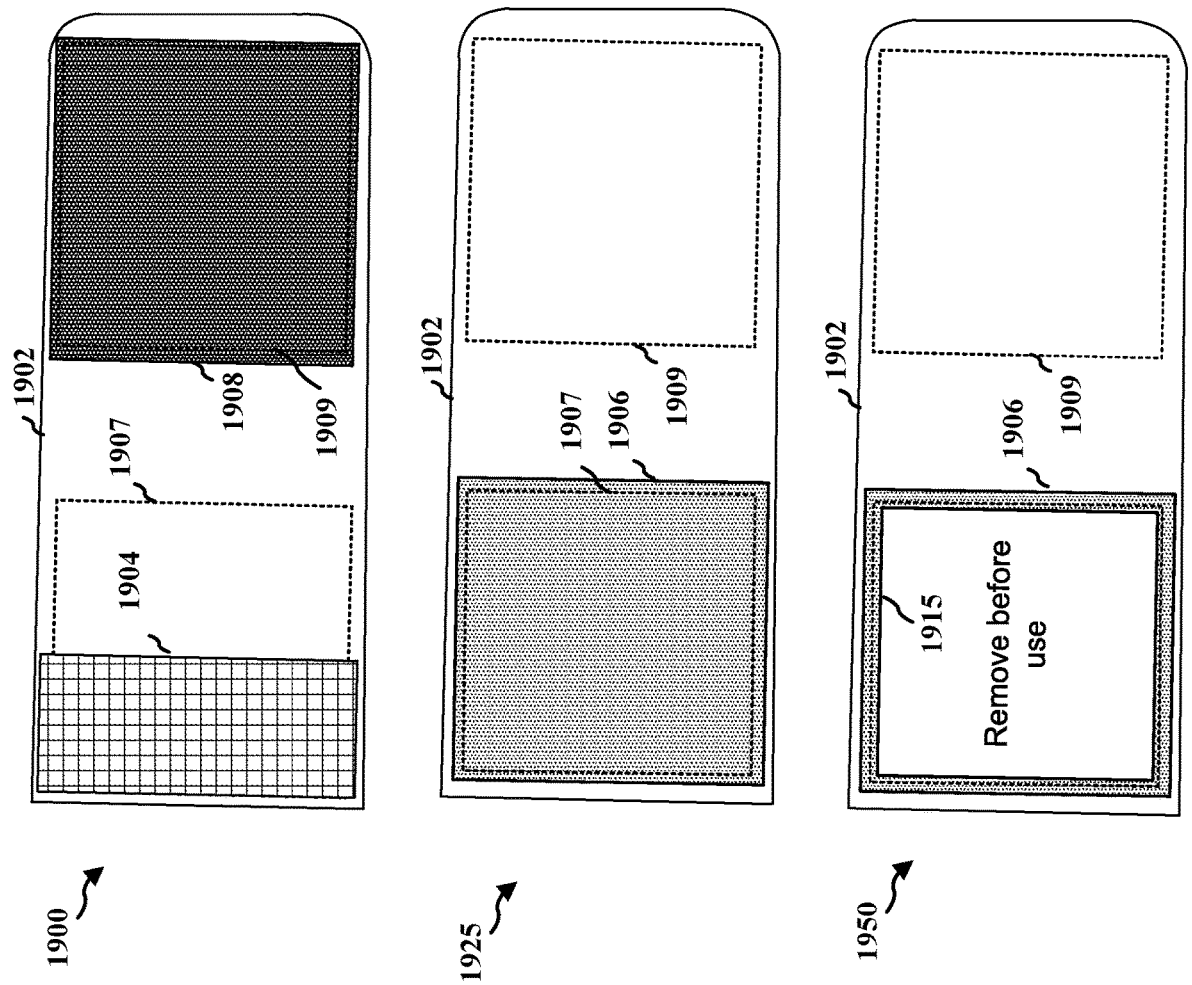
FIG. 19 illustrates example views of a secondary strap extension component.

In addition to, or as an alternative to, the extension piece that extends a length of the primary wrap, e.g., as described in connection with FIGS. 14-18E, a strap extension may be provided that can be removably fastened to one or more of the secondary straps (e.g., 72, 72a, 72b) of the abdominal compression device. The abdominal compression device may include any of the aspects described in connection with FIGS. 1-18. FIG. 19 illustrates different sides of an example secondary strap extension piece 1902. In the first view 1900, a first side of the extension 1902, which is configured to be attached to the secondary strap in a position away from the patient, includes a handle 1904 and a fastening mechanism. The handle 1904 may have a loop shape or an opening that is configured to receive the user's fingers to allow the user to grab the handle 1904 in order to pull the secondary strap, as extended through coupling with the secondary strap extension piece 1902, to apply a desired amount of targeted compression. The handle may assist a user in pulling the end of an extended secondary strap (e.g., after coupling with the extension) to apply or adjust targeted compression to the abdomen of the patient. The handle may include leverage for the user in applying compression and may help to prevent injuries in the user applying the compression. As well, the handle may enable the user to provide a more targeted amount or area of compression.

Once the targeted compression is achieved by pulling the secondary strap, the user may use the hook material to removably fasten the end of the extended secondary strap to the exterior surface of the primary wrap in order to maintain the targeted compression. The fastening mechanism for attaching the secondary strap extension piece may include a loop material 1908 that is configured to removably fasten to or couple to a hook material provided on an opposite side of the secondary strap. The loop material 1908 may be sewn to, or otherwise attached to, the secondary strap extension piece 1902. FIG. 19 illustrates stitching 1909 as an example manner in which the loop material 1908 may be attached to the secondary strap extension piece 1902. As described in connection with FIGS. 2-4, a hook material at the movable end of the secondary strap 72 may be used to hold the end of secondary strap 72 to a surface 78 of the primary wrap 10, e.g., after stretching the secondary strap 72 into a position to provide targeted compression. Therefore, the secondary strap extension 1902 may be configured to couple to a fastening mechanism, e.g., the hook material, that is already provided at the end of the secondary strap 72 that extends from the primary wrap 10.

As show in the diagram 1925, the opposite side of the secondary strap extension piece 1902 may include a hook material 1906 that can be used to hold the end of the extended secondary strap to a surface of the primary wrap, e.g., after stretching the secondary strap into a position to provide targeted compression. For example, the hook material 1906 on the end of the extension piece may be used in place of the hook material of the secondary strap, which fastens or couples the extension to the secondary strap. Similar to the stitching 1909, 1925 illustrates stitching 1907 that may be used to attach the hook material 1906 to the secondary strap extension piece 1902. As illustrated at 1950, a protective layer 1915 may be provided over the hook material of the secondary strap extension piece 1902, and may be removed prior to use. The secondary strap extension piece 1902 may include an elastic material. The secondary strap may comprise a strap of elastic material to which the loop material 1908, the hook material 1906, and/or the handle 1904 are sewn. In some aspects, the secondary strap extension piece 1902 may include a portion of elastic material provided between the loop material and the handle. In some aspects, the elastic material may include a double layer of elastic material. The double layer of the elastic material may be the same as, or similar to, a double layer of elastic material comprised in the secondary strap that extends from the primary wrap. The double layer of elastic material may increase tensile strength of the secondary strap and extension.

The ability to extend a length of the secondary strap may enable the user to apply a different type of targeted compression, e.g., targeted compression in a different area or an extended area.

Figure 20:
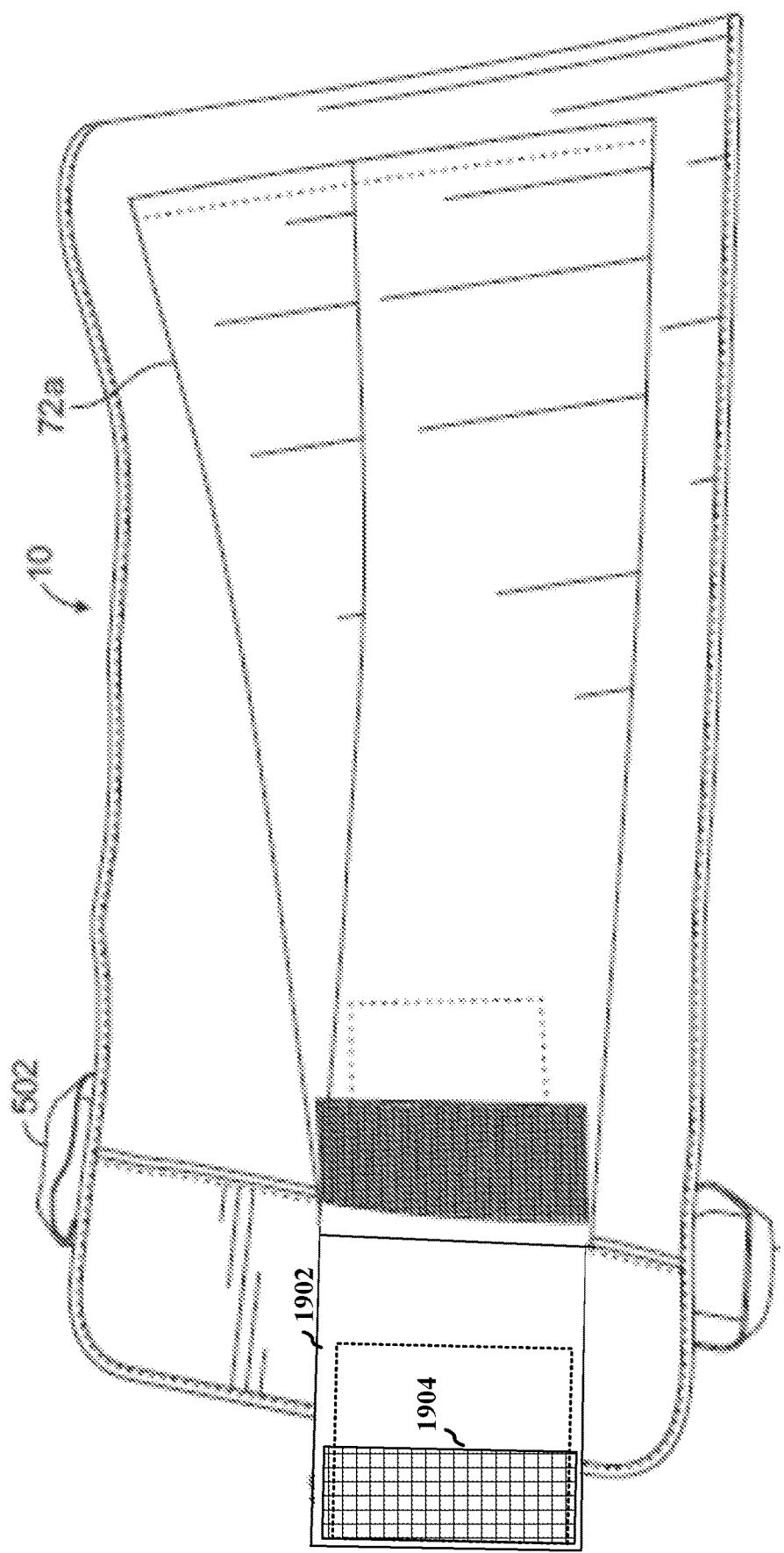
FIG. 20 illustrates a portion of an endoscopy band having a secondary strap extension component coupled to a secondary strap.
Figure 21:
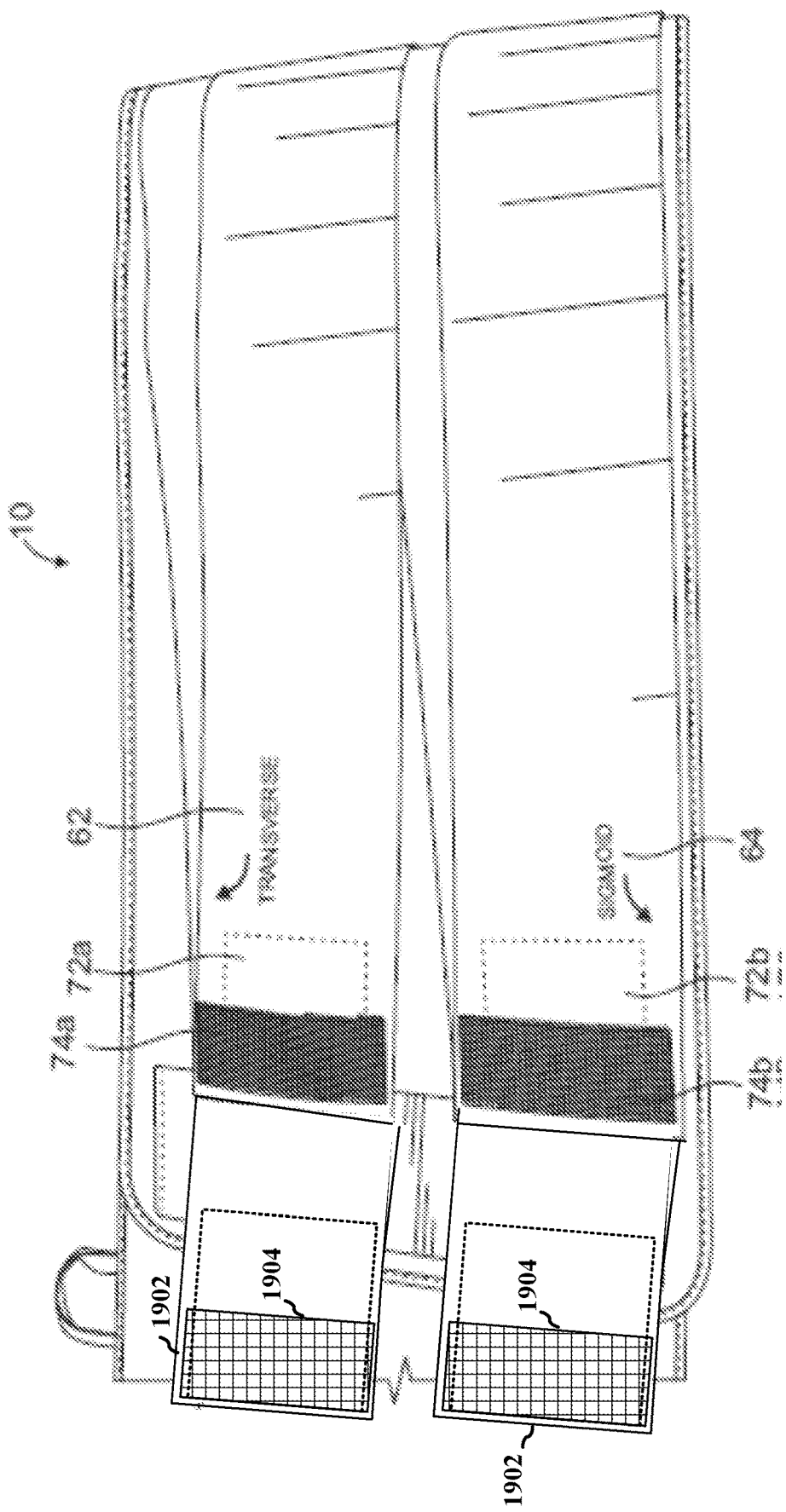
FIG. 21 illustrates a portion of an endoscopy band having secondary strap extension components coupled to multiple secondary straps.

FIG. 20 illustrates a portion of an abdominal compression device as described in connection with FIG. 5 and having a primary wrap 10 and a single secondary strap 72*a* with a secondary strap extension piece 1902 coupled to the end of the secondary strap 72*a*, e.g., as described in connection with FIG. 19. FIG. 21 illustrates a portion of an abdominal compression device as described in connection with FIG. 8 and having a primary wrap 10 and multiple secondary straps 72*a* and 72*b* with a secondary strap extension piece 1902 coupled to the end of each of the secondary straps 72*a* and 72*b*, e.g., as described in connection with FIG. 19.

Figure 22C:
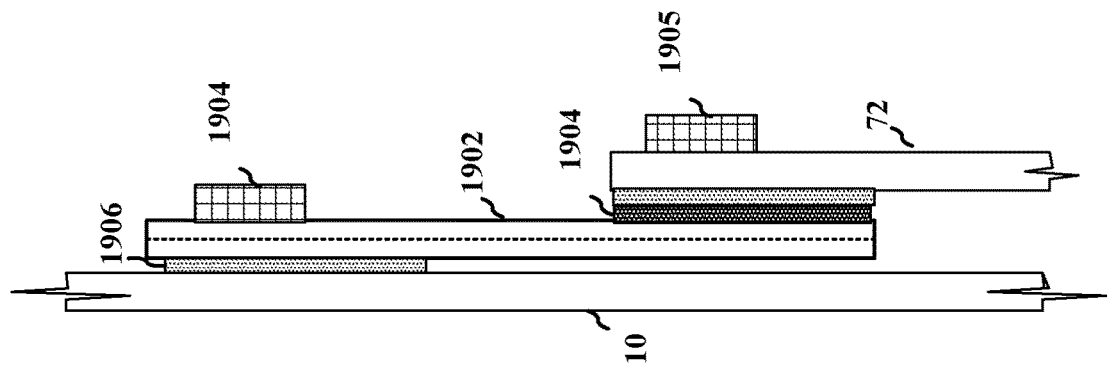
FIGS. 22A, 22B, and 22C illustrate aspects of an extension component for a secondary strap and a manner of applying the extension piece to the secondary strap.
Figure 22B:
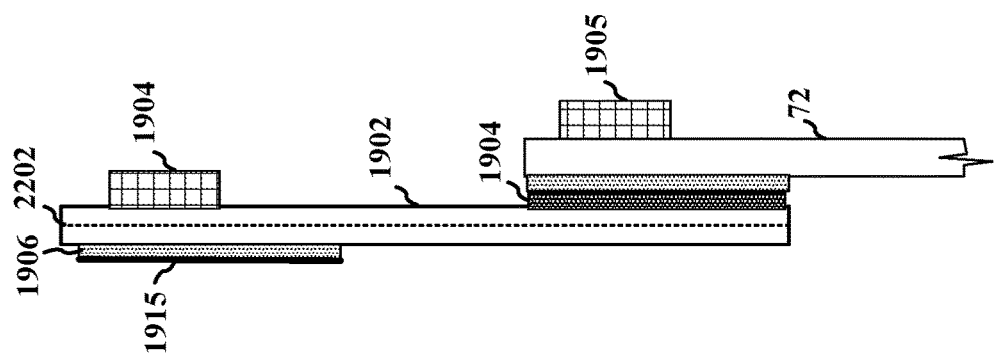
Figure 22A:
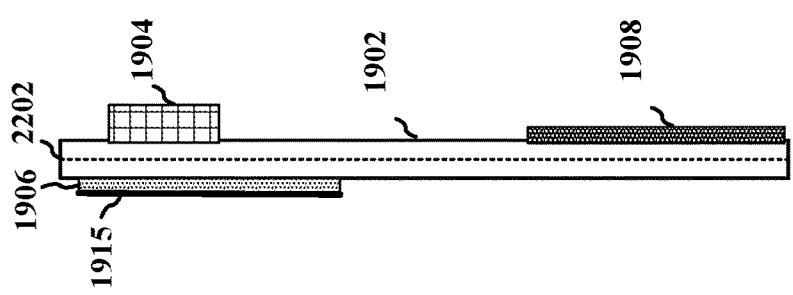

FIGS. 22A, 22B, and 22C illustrate a side view showing a secondary strap extension piece 1902, as described in connection with FIG. 19, being attached to the movable end of the secondary strap (e.g., 72, 72*a*, 72*b*). FIG. 22A illustrates the secondary strap extension piece 1902 prior to attachment to the secondary strap of an abdominal compression device. In FIG. 22A, a protective layer 1915 is applied to the surface of the hook material 1906 in order to prevent unintended snagging on fabric or to avoid skin irritation during application to a patient. In FIG. 22B, the secondary strap extension piece 1902 is removably coupled to, fastened to, or attached to an end of the secondary strap 72 by pressing the hook material 1907 at the end of the secondary strap 72 into the loop material 1904 of the secondary strap extension piece 1902 to removably fasten or couple the two materials together. The end of the secondary strap 72 is the movable end having the handle 1905 (e.g., handle 76). FIG. 22C illustrates a time at which the extended secondary strap (including the secondary strap extension piece 1902 coupled to the secondary strap 72) can be removably coupled to an exterior surface of the primary wrap 10 by attaching the hook material 1906 of the secondary strap extension piece 1902 to the primary wrap, e.g., as described in connection with any of FIG. 2-4, 5, 6, 8, 10, or 12. In FIG. 22C, the protective layer 1915 is removed so that the hook material can fasten to the material of the primary wrap to hold the extended secondary strap in a position to apply a constant, targeted compression. In FIGS. 22A-C, the dashed line 2202 illustrates that the secondary strap extension piece 1902 may include a double elastic layer, e.g., similar to the examples described in connection with FIG. 8, 10, or 12.

The extension pieces, e.g., whether for the primary wrap or the secondary straps, help to improve manufacturing efficiency while also enabling a compression device that may be adjusted to accommodate patients of various sizes. The abdominal compression device may be manufactured having a primary wrap and secondary straps that are configured to be applied to patients within a first range of sizes. The extension pieces (e.g., for the primary wrap and/or secondary strap) may be provided as an extension kit that can be used to adjust the size of the abdominal compression device to meet the needs of a particular patient. By allowing for an adjustable size of the wrap, a provider may adjust the size of a compression device, as needed. If two different sizes of compression devices are stocked rather than an extension kit, the user may not have the correct size in stock for a particular patient. As an example, the user may only have a larger size in stock when a patient needs a smaller sized device. Similarly, the user may only have a smaller size of the compression device in stock when a patient needs a larger sized device. In contrast, the extension kit enables the user to meet the needs of a particular client by adjusting the size of the abdominal compression device, if needed, for a particular patient. The adjustable size simplifies the supply decisions about the amount of different sized devices to keep in stock.

Improving patient comfort and reducing complications, both during and following endoscopic procedures is very important. Aspects presented herein reduce patient discomfort and complications by helping to prevent and reduce looping such as sigmoid looping or looping in other areas of the colon, which can be a primary cause of patient pain and discomfort.

Patients often become cold or uncomfortably chilled once they change into the garments such as hospital gowns typically worn while undergoing an endoscopic procedure. Many patients request and are provided with blankets, and some facilities provide electric heated blankets, or blankets that have been previously warmed. The heated blankets provide physical warmth, but also they tend to relax the patient and relieve anxiety or discomfort the patient may be experiencing. Aspects presented herein may also help the patient to feel warm and comfortable during the procedure.

The extension components described in connection with any of FIGS. 13-22 may be used in connection with an abdominal compression device as described in connection with any of FIGS. 2-12.

Figure 9:
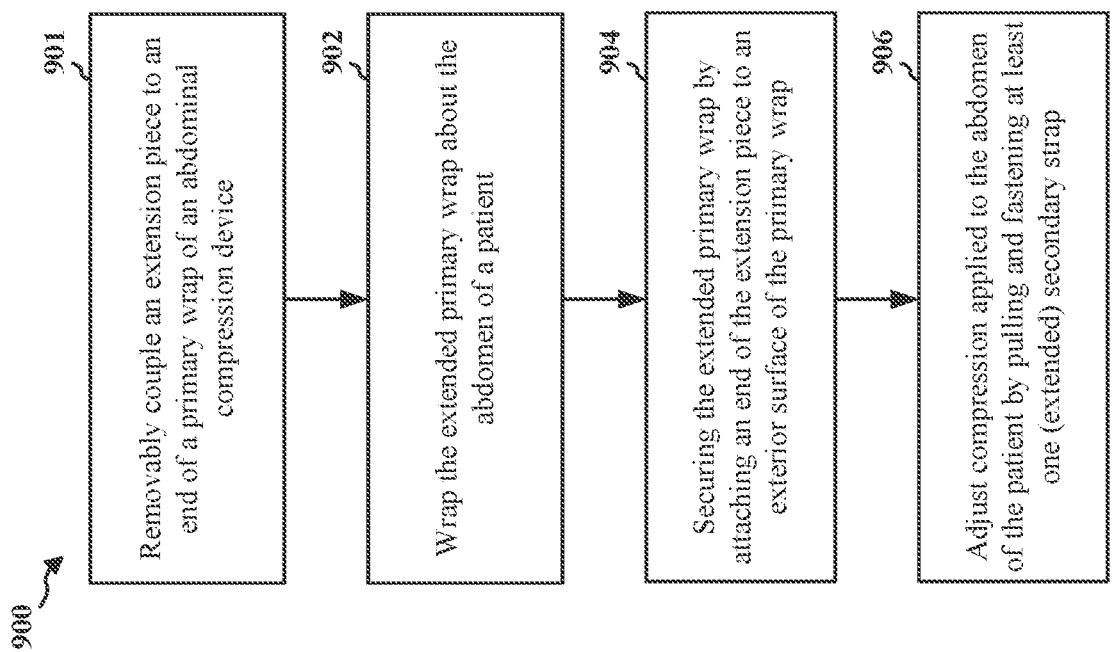
FIG. 9 is a flowchart of an example method of use of an endoscopy band as described herein.

FIG. 9 illustrates aspects of a method for extending a compression device for applying pressure and support to a patient's abdomen during advancement of an endoscope during an endoscopy type procedure. The endoscopy procedure may include any of a colonoscopy or a visualization of the small bowel.

At 901, the method includes removably coupling an extension piece (e.g., such as described in connection with any of FIGS. 14-18) to an end of a primary wrap in order to form an extended primary wrap having a longer length. In order to removably couple the extension piece to the primary wrap, the method may include inserting the end of the primary wrap between a first piece and a second piece of the extension and engaging a fastening mechanism between the first piece and the primary wrap and between the second piece and the primary wrap. In some aspects, the part of the primary wrap that is received between the first and second piece of the extension may include a loop material or a hook material, and an interior portion of the first piece and the second piece that is configured to receive the primary wrap may include the opposite of the hook material or the loop materials. As an example, the first side of the primary wrap may be removably coupled to the first piece by pressing a hook material on the first piece to the loop material on the received portion of the primary wrap. The opposite side of the primary wrap may be removably coupled to the second piece by pressing a hook material on the second piece to the loop material on the received portion of the primary wrap. FIGS. 17A-E and 18A-E illustrate example aspects of removably coupling the extension to the primary wrap.

At 902, the method includes wrapping the extended primary wrap about the abdomen of a patient between the hips and umbilicus of the patient, such as described in connection with FIGS. 2-4. The extended primary wrap may include any of the aspects described in connection with FIGS. 1-8 and/or 10-22.

At 904, the method includes securing the extended primary wrap by attaching an end of the extension piece of the extended primary wrap to a second portion of the primary wrap after wrapping the primary wrap about the abdomen of the patient.

At 906, the method includes adjusting compression applied to the abdomen of the patient by pulling at least one strap extending from the primary wrap across at least a portion of the primary wrap and to fasten the strap to at least a third portion of the primary wrap, such as illustrated in FIG. 4. The at least one strap may include any of the aspects described in connection with FIGS. 1-8 and/or 10-12. In some aspects, the method may include applying an extension piece (e.g., such as 1902) to one or more secondary strap to form an extended secondary strap, e.g., such as illustrated in FIGS. 20, 21, and 22A-C.

The amount of compression applied to the abdomen of the patient may be adjusted by pulling a strap extending from the primary wrap across at least a portion of the primary wrap at 906 and fastening the strap to the primary wrap. The strap may be coupled to a portion of the primary wrap that is configured for placement over a left side of the subject's lower abdomen. This allows the patient's own body weight to be leveraged in order to adjust the compression provided by the strap. The strap may be configured to be pulled in a direction toward a right side of the subject's lower abdomen to adjust the amount of pressure applied by the endoscopy support apparatus. A combination of visual indicators may enable correct placement of the device on a patient and may assist in applying targeted compression through adjustment of the at least one strap. The at least one visual indicator may include any of the aspects described in connection with FIGS. 1-8 and/or 10-12.

The primary wrap is placed relative to the abdomen of the patient and/or the strap is extended using at least one visual indicator. The at least one visual indicator may include a visual indication of a direction of stretching the at least one elastic band to apply the additional targeted force to a sigmoid region of the subject, such as described in connection with the examples in FIGS. 6 and 8. The visual indication may include an arrow illustrating the direction and/or text indicating the sigmoid region. Thus, at 906, the method may include using the visual indication to adjust the strap to apply targeted force to the sigmoid colon of the subject. A sigmoid region is one example of a region of the colon that the visual indicator may reference.

To additionally enhance patient comfort, certain aspects of the invention are designed to be single-use, and to remain fastened in place on the patient during the procedure and/or following the procedure. For example, maintaining the compression applied by the device during the withdrawal phase of the procedure and while imaging is performed may help improve the detection of adenoma. The device may be maintained on the patient to reduce the common post-procedure complications of bloating and abdominal pain caused by bloating. Otherwise known as gaseous distention, bloating occurs following endoscopy procedures because physicians often use compressed air or carbon dioxide to insufflate parts of the bowel that are difficult to see and examine. The gas opens up the area to allow for a more complete visualization, enhancing the efficacy of the procedure. However, the gas also remains in the patient until it is either absorbed or expelled. Expulsion is the primary gas removal mechanism as absorption is a very inefficient process. Gaseous distention is a primary post-procedure complication and a frequent complaint from patients. However, when the wrap described herein remains in place after the procedure, the lower abdominal compression generated by the device allows the bowel to more rapidly evacuate trapped by directing excess gas towards the rectum. As a result, the severity and duration of post-procedure bloating and associated abdominal pain may be reduced.

Example aspects of the present invention have now been described in accordance with the above advantages. It will be appreciated that these examples are merely illustrative of aspects of the present invention. Many variations and modifications will be apparent to those skilled in the art.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The following aspects are illustrative only and may be combined with other aspects or teachings described herein, without limitation.

Aspect 1 is an endoscopy support system, comprising: an extendable primary wrap comprising a band of elastic material sized for placement around a lower abdomen of a subject; at least one elastic secondary strap having a first end fixed to the extendable primary wrap and a second end comprising a coupling mechanism for removably coupling the second end to the extendable primary wrap, wherein the at least one elastic secondary strap is configured to extend in a left to right direction across a front abdomen portion of the extendable primary wrap in order to exert an additional targeted force to a targeted area of an abdomen of the subject; and at least one extension piece having an attachment mechanism to removably couple to the extendable primary wrap or the at least one elastic secondary strap.

In aspect 2, the endoscopy support system of aspect 1, further includes that the at least one extension piece includes a first extension component configured to removably couple to the extendable primary wrap.

In aspect 3, the endoscopy support system of aspect 2, further includes that the first extension component includes: a fastening portion at a first end of the first extension component including one of a hook material or a loop material that is shaped to removably couple to an opposite type of the hook material or the loop material at the extendable primary wrap; and a closure mechanism at a second end opposite the first end of the first extension component for removably securing the first extension component to an exterior surface of the extendable primary wrap.

In aspect 4, the endoscopy support system of aspect 3, further includes that the closure mechanism includes the hook material.

In aspect 5, the endoscopy support system of aspect 3 or aspect 4, further includes that the fastening portion of the first extension component includes: a first piece extending from the first extension component at the fastening portion; and a second piece extending from the first extension component at the fastening portion, the first piece and the second piece being configured to receive a portion of the extendable primary wrap between the first piece and the second piece.

In aspect 6, the endoscopy support system of aspect 5, further includes that the first piece includes a first section of the hook material and the second piece includes a second section of the hook material on a side facing the first section of the hook material.

In aspect 7, the endoscopy support system of any of aspects 2-6, further includes that the at least one extension piece includes a second extension component configured to removably couple to a secondary strap.

In aspect 8, the endoscopy support system of aspect 7, further includes that the second extension component includes: a handle at a first end of the second extension component and on a first side of the second extension component; a hook material at the first end of the second extension component and on a second side of the second extension component, the hook material configured to removably couple to an exterior surface of the extendable primary wrap; and a loop material at a second end of the second extension component and at the first side of the second extension component, the second end being opposite the first end.

In aspect 9, the endoscopy support system of aspect 7, further includes that the at least one extension piece includes a third extension component configured to removably couple to an additional secondary strap.

In aspect 10, the endoscopy support system of an of aspects 1-9, further includes that the at least one extension piece includes a secondary strap extension component configured to removably couple to a secondary strap.

In aspect 11, the endoscopy support system of aspect 10, further includes that the secondary strap extension component includes: a handle at a first end of the secondary strap extension component and on a first side of the secondary strap extension component; a hook material at the first end of the secondary strap extension component and on a second side of the secondary strap extension component, the hook material configured to removably couple to an exterior surface of the extendable primary wrap; and a loop material at a second end of the secondary strap extension component and at the first side of the secondary strap extension component, the second end being opposite the first end.

In aspect 12, the endoscopy support system of aspect 10, further includes that the at least one extension piece includes multiple secondary strap extension components.

In aspect 13, the endoscopy support system of any of aspects 1-11, further includes that at least one of the extendable primary wrap or the at least one extension piece include a visual indicator that illustrates alignment between the extendable primary wrap and the at least one extension piece.

In aspect 14, the endoscopy support system of aspect 13, further includes that the extendable primary wrap includes one or more first visual markers and the at least one extension piece includes one or more second visual markers that align with the one or more first visual markers when the at least one extension piece is correctly positioned with the extendable primary wrap.

In aspect 15, the endoscopy support system of aspect 13 or 14, further includes that the at least one extension piece includes text describing a correct position relative to the extendable primary wrap.

In aspect 16, the endoscopy support system of any of aspects 1-15, further comprising: at least one of a high visibility yarn, a high visibility treatment, a high visibility coating, a high visibility ink, or a high visibility marking applied to at least one of the at least one extension piece, the extendable primary wrap, or the at least one elastic secondary strap.

In aspect 17, the endoscopy support system of any of aspects 1-16, further comprising: a retro reflective marking comprised in at least one of the at least one extension piece, the extendable primary wrap, or the at least one elastic secondary strap.

In aspect 18, the endoscopy support system of any of aspects 1-17, further comprising: a retro reflective line or stitching comprised at one or more handles included in the extendable primary wrap or the at least one elastic secondary strap.

Aspect 19 is an extension kit for an endoscopy support apparatus, comprising: at least one extension piece, each extension piece including: an elastic material; and a fastener configured to removably couple a corresponding extension piece to a component of an endoscopy support band.

In aspect 20, the extension kit for the endoscopy support apparatus of aspect 19, further includes that the at least one extension piece includes a first extension component configured to removably couple to a primary band of the endoscopy support apparatus.

In aspect 21, the extension kit for the endoscopy support apparatus of aspect 20, further includes that the first extension component includes: a fastening portion at a first end of the first extension component including one of a hook material or a loop material that is shaped to removably couple to an opposite type of the hook material or the loop material at the primary band of the endoscopy support apparatus; and a closure mechanism at a second end opposite the first end of the first extension component for removably securing the first extension component to an exterior surface of the primary band.

In aspect 22, the extension kit for the endoscopy support apparatus of aspect 21, further includes that the closure mechanism includes the hook material.

In aspect 23, the extension kit for the endoscopy support apparatus of aspects 21 or 22, further includes that the fastening portion of the first extension component includes: a first piece extending from the first extension component at the fastening portion; and a second piece extending from the first extension component at the fastening portion, the first piece and the second piece being configured to receive a portion of the primary band of the endoscopy support apparatus between the first piece and the second piece.

In aspect 24, the extension kit for the endoscopy support apparatus of aspect 23, further includes that the first piece includes a first section of the hook material and the second piece includes a second section of the hook material on a side facing the first section of the hook material.

In aspect 25, the extension kit for the endoscopy support apparatus of aspect 21, further includes that the at least one extension piece includes a second extension component configured to removably couple to a secondary strap of the endoscopy support apparatus.

In aspect 26, the extension kit for the endoscopy support apparatus of aspect 25, further includes that the second extension component includes: a handle at a first end of the second extension component and on a first side of the second extension component; a hook material at the first end of the second extension component and on a second side of the second extension component, the hook material configured to removably couple to an exterior surface of the primary band of the endoscopy support apparatus; and a loop material at a second end of the second extension component and at the first side of the second extension component, the second end being opposite the first end.

In aspect 27, the extension kit for the endoscopy support apparatus of aspect 25, further includes that the at least one extension piece includes a third extension component configured to removably couple to an additional secondary strap of the endoscopy support apparatus.

In aspect 28, the extension kit for the endoscopy support apparatus of any of aspects 19-27, further includes that the at least one extension piece includes a secondary strap extension component configured to removably couple to a secondary strap of the endoscopy support apparatus.

In aspect 29, the extension kit for the endoscopy support apparatus of aspect 28, further includes that the secondary strap extension component includes: a handle at a first end of the secondary strap extension component and on a first side of the secondary strap extension component; a hook material at the first end of the secondary strap extension component and on a second side of the secondary strap extension component, the hook material configured to removably couple to an exterior surface of the primary band of the endoscopy support apparatus; and a loop material at a second end of the secondary strap extension component and at the first side of the secondary strap extension component, the second end being opposite the first end.

In aspect 30, the extension kit for the endoscopy support apparatus of aspect 28, further includes that the at least one extension piece includes multiple secondary strap extension components.

In aspect 31, the extension kit for the endoscopy support apparatus of any of aspects 19-30, further includes that the at least one extension piece includes a visual indicator that illustrates alignment between the endoscopy support band and the at least one extension piece.

In aspect 32, the extension kit for the endoscopy support apparatus of aspect 31, further includes that the at least one extension piece includes one or more visual markers that align with the one or more corresponding visual markers when the at least one extension piece is correctly positioned with the endoscopy support band.

In aspect 33, the extension kit for the endoscopy support apparatus of aspect 32, further includes that the at least one extension piece includes text describing a correct position relative to the endoscopy support band.

Aspect 34 is an endoscopy support apparatus comprising: an extendable primary wrap comprising a band of elastic material sized for placement around a lower abdomen of a subject; at least one elastic secondary strap having a first end fixed to the extendable primary wrap and a second end comprising a coupling mechanism for removably coupling the second end to the extendable primary wrap, wherein the at least one elastic secondary strap is configured to extend in a left to right direction across a front abdomen portion of the extendable primary wrap in order to exert an additional targeted force to a targeted area of an abdomen of the subject; and a high visibility feature included in at least one of the extendable primary wrap or the at least one elastic secondary strap.

In aspect 35, the endoscopy support apparatus of aspect 34, further includes that the high visibility feature includes at least one of a high visibility yarn, a high visibility treatment, a high visibility coating, a high visibility ink, or a high visibility marking.

In aspect 36, the endoscopy support apparatus of aspect 34 or 35, further includes that the high visibility feature includes: a retro reflective marking formed on at least one of the extendable primary wrap or the at least one elastic secondary strap.

In aspect 37, the endoscopy support system of any of aspects 34-36, further includes that the high visibility feature includes: a retro reflective line or stitching comprised at one or more handles or loops included in the extendable primary wrap or the at least one elastic secondary strap.

The invention claimed is:

1. An endoscopy support system, comprising:
an extendable primary wrap comprising a band of elastic material sized for placement around a lower abdomen of a subject and having a first coupling mechanism configured to removably couple to an outer surface of the extendable primary wrap;
at least one elastic secondary strap having a first end fixed to the extendable primary wrap and a second end comprising a second coupling mechanism configured to removably couple the second end to a surface of the extendable primary wrap, wherein the at least one elastic secondary strap is configured to extend in a left to right direction across a front abdomen portion of the extendable primary wrap in order to exert an additional targeted force to a targeted area of an abdomen of the subject; and
at least one extension piece having an attachment mechanism configured to removably couple to the extendable primary wrap or the at least one elastic secondary strap, wherein the at least one extension piece is separate from and not fixed to the extendable primary wrap and the at least one elastic secondary strap, wherein each of the at least one extension piece includes:
a first fastening portion at a first end of a respective extension piece, wherein the first fastening portion is configured to removably fasten to the first coupling mechanism of the extendable primary wrap or the second coupling mechanism of an elastic strap of the at least one elastic secondary strap;

a second fastening portion at a second end of the respective extension piece, wherein the second end is opposite the first end of the respective extension piece; and a portion of the respective extension piece between the first end and the second end that spaces the first fastening portion from the second fastening portion to provide an iteratively extendable length to the extendable primary wrap or the elastic strap of the at least one elastic secondary strap.

2. The endoscopy support system of claim 1, wherein the portion of the respective extension piece between the first end and the second end includes an elastic material portion.

3. The endoscopy support system of claim 2, wherein the at least one extension piece includes:
a first extension piece configured to removably couple to the extendable primary wrap;
a second extension piece configured to removably couple to a first elastic secondary strap; and
a third extension piece configured to removably couple to a second elastic secondary strap.

4. The endoscopy support system of claim 3, wherein the at least one extension piece is configured to removably couple to the at least one elastic secondary strap, wherein the first fastening portion at the first end and a first side of the respective extension piece includes a loop material configured to removably fasten to a hook material at the at least one elastic secondary strap,
wherein the second fastening portion at the second end of the respective extension piece includes the hook material at a second side opposite the first side, wherein the hook material at the second end and the second side of the respective extension piece is configured to removably fasten to the outer surface of the extendable primary wrap or the elastic strap of the at least one elastic secondary strap.

5. The endoscopy support system of claim 4, wherein the at least one extension piece further includes a handle at the second end and the first side, wherein the handle extends across a majority of a width of the second end of the at least one extension piece.

6. The endoscopy support system of claim 1, wherein the at least one extension piece is a primary wrap extension component configured to extend a primary wrap length, and wherein the first fastening portion of the first end of the respective extension piece includes:
a first piece; and
a second piece including a hook material being configured to receive an end portion of the extendable primary wrap between the first piece and the second piece, and wherein the second fastening portion at the second end of the respective extension piece includes a loop material.

7. The endoscopy support system of claim 1, wherein the at least one extension piece is a primary wrap extension component configured to extend a primary wrap length and further includes:
a first handle positioned at a first side edge between the first end and the second end of the primary wrap extension component, wherein the first handle is spaced from the first end and the second end of the primary wrap extension component; and
a second handle positioned opposite the first handle at a second side edge between the first end and the second end of the primary wrap extension component, wherein the first side edge of the primary wrap extension component is opposite the second side edge of the primary wrap extension component.

8. The endoscopy support system of claim 7, wherein the first handle is attached at a first angle relative to the first side edge and the second handle is attached at a second angle relative to the second side edge.

9. The endoscopy support system of claim 1, wherein the at least one extension piece includes multiple secondary strap extension components.

10. The endoscopy support system of claim 1, wherein at least one of the extendable primary wrap or the at least one extension piece include a visual indicator that illustrates alignment between the extendable primary wrap and the at least one extension piece.

11. The endoscopy support system of claim 10, wherein the extendable primary wrap includes one or more first visual markers and the at least one extension piece includes one or more second visual markers that align with the one or more first visual markers when the at least one extension piece is correctly positioned with the extendable primary wrap.

12. The endoscopy support system of claim 10, wherein the at least one extension piece includes text describing a correct position relative to the extendable primary wrap.

13. The endoscopy support system of claim 1, further comprising, applied to at least one of the at least one extension piece, the extendable primary wrap, or the at least one elastic secondary strap, one or more of:
a high visibility yarn,
a high visibility treatment,
a high visibility coating,
a high visibility ink, or
a high visibility marking.

14. The endoscopy support system of claim 1, further comprising:
a retro reflective marking comprised in at least one of the at least one extension piece, the extendable primary wrap, or the at least one elastic secondary strap.

15. The endoscopy support system of claim 1, further comprising:
a retro reflective line or stitching comprised at one or more handles included in the extendable primary wrap or the at least one elastic secondary strap.

* * * * *